LOGIC CIRCUIT

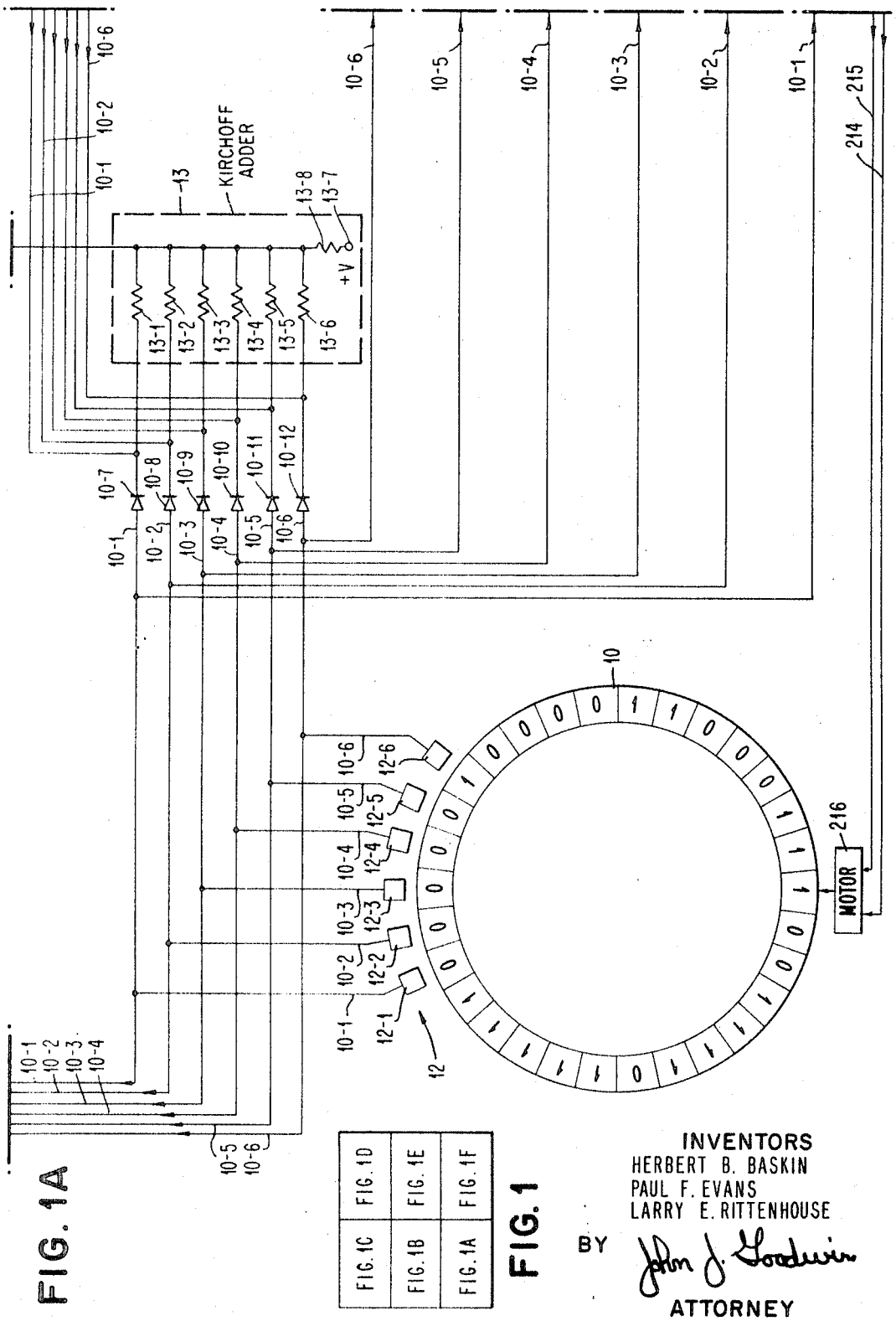
Aug. 12, 1969    H. B. BASKIN ET AL    3,461,449
WHEEL POSITIONING MECHANISM USING A CLOSED CODING RING
Filed May 25, 1965    7 Sheets-Sheet 1
INVENTORS
HERBERT B. BASKIN
PAUL F. EVANS
LARRY E. RITTENHOUSE
BY John J. Goodwin
ATTORNEY

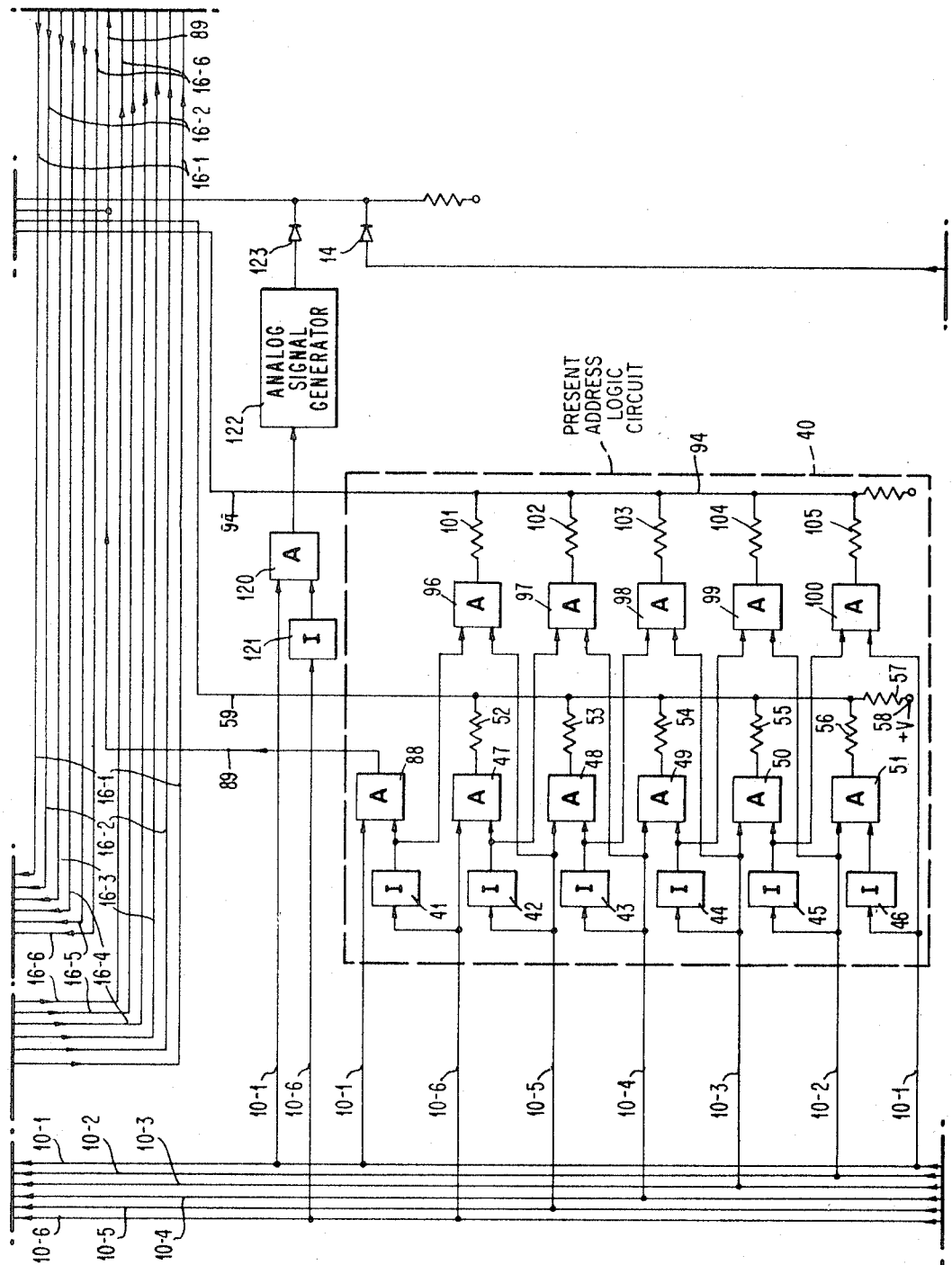

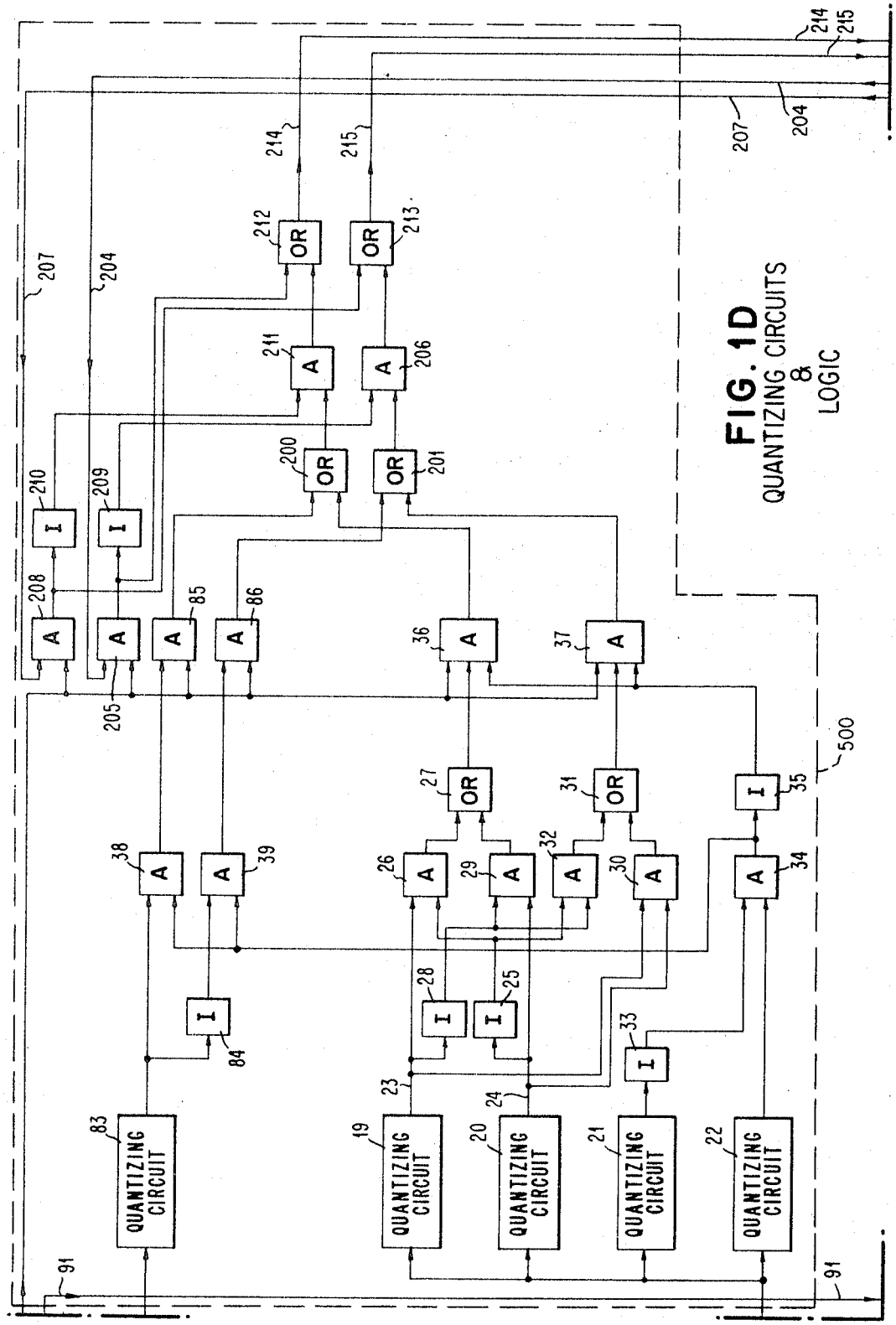

FIG. 1F LOGIC CIRCUIT

United States Patent Office 3,461,449
Patented Aug. 12, 1969

3,461,449
WHEEL POSITIONING MECHANISM USING A CLOSED CODING RING
Herbert B. Baskin, Mohegan Lake, and Paul F. Evans, Yorktown Heights, N.Y., and Larry E. Rittenhouse, East Lansing, Mich., assignors to International Business Machines Corporation, Armonk, N.Y., a corporation of New York
Filed May 25, 1965, Ser. No. 458,705
Int. Cl. G11b 5/00
U.S. Cl. 340—347      12 Claims

ABSTRACT OF THE DISCLOSURE

A rotary wheel carries a closed coding ring with sensors serially placed above information bits on the ring. The sensors detect the position of the ring and feed position information to logic circuits where it is compared with desired position informaton. If the two sets of information are not equal a motor will turn the wheel until the desired position is reached by the shortest possible route.

The present invention relates to a code generating system, and more particularly to a system for accessing a drum, disc or other rotary element by means of code indicia and sensors therefor.

In a large number of diverse applications it is necessary to angularly position a rotary element in response to a coded input signal. Such unrelated rotary devices as gun turrets, radar beacons, storage drums, machine tools, magnetic storage discs, print wheels, etc., may be indexed to a particular angular position in response to an angular position signal in the form of a digital code. Particularly in view of the widespread use of digital processors such as computers and calculators, it is desirable that such rotary devices be responsive directly from digital signals rather than employ the use of digital to analog converters. Likewise, there are rotary devices which are angularly positioned by independent means, for example, direction indicators, instrument pointer arms and the like, wherein it is desirable that the shaft angle thereof be directly read out in digital code.

It is an object of the present invention to provide a rotary element accessing system and code therefor.

Another object of the present invention is to provide a rotary element accessing code which closes on itself, that is, a closed code sequence that has no distinct starting point.

A further object of the present invention is to provide an accessing code as described which is what is referred to as a walking code.

Still another object of the present invention is to provide an accessing code for a rotary element wherein the element may be rotated from one angular position to another angular position by the shortest route.

A still further object of the present invention is to provide an accessing code as described which requires only one information track.

The foregoing and other objects, features and advantages of the invention will be apparent from the following more particular description of a preferred embodiment of the invention, as illustrated in the drawings.

In the drawings:

FIG. 1 is a plan drawing showing how FIGS. 1A, 1B, 1C, 1D, 1E, and 1F should be assembled. FIGS. 1A through 1F, when assembled, provide a schematic diagram of an embodiment of a code apparatus following the principles of the present invention.

Figure 1C:
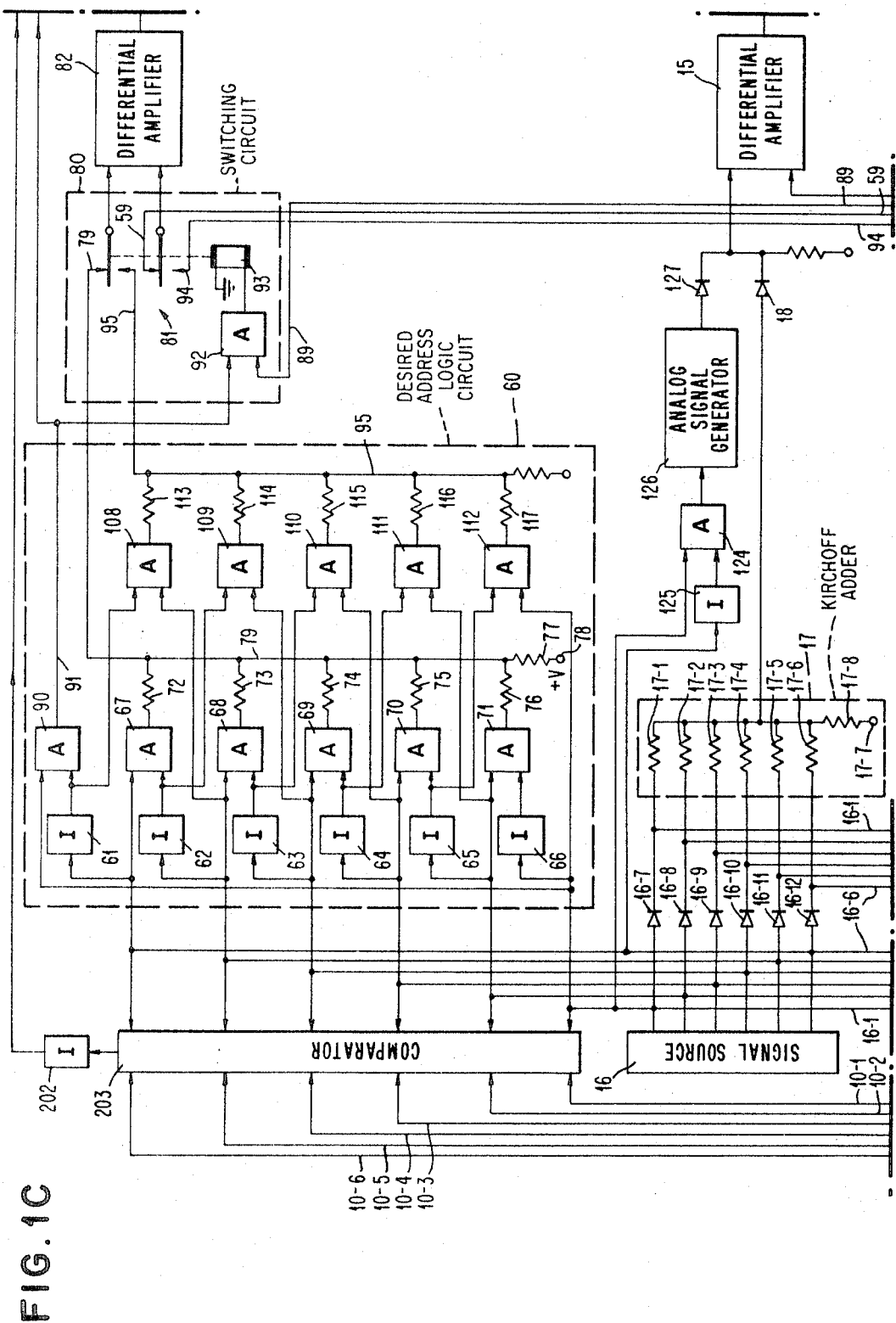

In FIG. 1A reference number 10 is applied to a rotary element. Rotary element 10 is representative of any device which may be varied in angular position. Rotary element 10 has contained thereon indicia representative of binary "1's" and "0's." Associated with rotary element 10 is a means 12 for reading the binary indicia. The manner in which the binary numbers are placed on the rotary element 10 is a matter of choice depending on the environment of the rotary element. For example, the binary numbers might be in the form of a magnetic record and means 12 would be a group of magnetic read heads or else the binary "1" could be represented by holes through which light is directed in which case the means 12 would include light responsive cells. In FIG. 1A the binary numbers are schematically shown as "1's" and "0's."

It is noted that in FIG. 1A there are thirty binary bits on rotary element 10 and there are six readout elements 12–1, 12–2, 12–3, 12–4, 12–5, and 12–6, having output leads 10–1, 10–2, 10–3, 10–4, 10–5, and 10–6, respectively. If the rotary element 10 were to be rotated one bit at a time, there would be thirty separate six bit words presented to the readout means 12. Presuming that the rotary element is rotated counterclockwise, one bit at the time, the following six bit words are presented to the readout means:

TABLE I

| | Readout element | | | | | | |
|---|---|---|---|---|---|---|---|
| | 12-1 | 12-2 | 12-3 | 12-4 | 12-5 | 12-6 | Word |
| Sector I | 0 | 0 | 0 | 0 | 0 | 1 | 1 |
| | 0 | 0 | 0 | 0 | 1 | 0 | 2 |
| | 0 | 0 | 0 | 1 | 0 | 0 | 3 |
| | 0 | 0 | 1 | 0 | 0 | 0 | 4 |
| | 0 | 1 | 0 | 0 | 0 | 0 | 5 |
| Sector II | 1 | 0 | 0 | 0 | 0 | 1 | 6 |
| | 0 | 0 | 0 | 0 | 1 | 1 | 7 |
| | 0 | 0 | 0 | 1 | 1 | 0 | 8 |
| | 0 | 0 | 1 | 1 | 0 | 0 | 9 |
| | 0 | 1 | 1 | 0 | 0 | 0 | 10 |
| Sector III | 1 | 1 | 0 | 0 | 0 | 1 | 11 |
| | 1 | 0 | 0 | 0 | 1 | 1 | 12 |
| | 0 | 0 | 0 | 1 | 1 | 1 | 13 |
| | 0 | 0 | 1 | 1 | 1 | 0 | 14 |
| | 0 | 1 | 1 | 1 | 0 | 0 | 15 |
| Sector IV | 1 | 1 | 1 | 0 | 0 | 1 | 16 |
| | 1 | 1 | 0 | 0 | 1 | 1 | 17 |
| | 1 | 0 | 0 | 1 | 1 | 1 | 18 |
| | 0 | 0 | 1 | 1 | 1 | 1 | 19 |
| | 0 | 1 | 1 | 1 | 1 | 0 | 20 |
| Sector V | 1 | 1 | 1 | 1 | 0 | 1 | 21 |
| | 1 | 1 | 1 | 0 | 1 | 1 | 22 |
| | 1 | 1 | 0 | 1 | 1 | 1 | 23 |
| | 1 | 0 | 1 | 1 | 1 | 1 | 24 |
| | 0 | 1 | 1 | 1 | 1 | 1 | 25 |
| Sector VI | 1 | 1 | 1 | 1 | 1 | 0 | 26 |
| | 1 | 1 | 1 | 1 | 0 | 0 | 27 |
| | 1 | 1 | 1 | 0 | 0 | 0 | 28 |
| | 1 | 1 | 0 | 0 | 0 | 0 | 29 |
| | 1 | 0 | 0 | 0 | 0 | 0 | 30 |

It is to be noted that each of the above-listed thirty binary words are separate and distinct, and each is generated by advancing the rotary element by one bit. Further, the binary bits close on themselves and there is no zero or start position associated with the rotary element. Since each of the thirty words are associated with a separate angular orientation, the employment of thirty bits and six sensors permit the rotary element 10 to be positioned (or the position thereof to be read out) to a resolution of twelve degrees. The thirty binary words in Table I have been grouped into six sectors of five words each for a reason to be later described.

The closed progressive code embodied in the rotary element 10 in FIG. 1A is representative of a class of binary sequences which may be incorporated as indicia on rotary devices. The class of codes may be defined as follows:

Let N be an integer greater than 1, let S be the number of sensors, and let P be the total number of binary bits in the code. The relationship is then:

$$(N)(N-1)=P \quad (1)$$
$$S=N$$

Thus, in the example of FIG. 1A, the expression would become:

$$(6)(5) = 30$$
$$S = N = 6$$

It is also to be noted that the code would be arranged as N sectors having $N-1$ bits, and hence, words per sector as set forth in Table I. Employing only the above expression (1), it is obvious that the code would be limited to selected numbers of bits, for example:

$N=2$ then $P=2$,
$N=3$ then $P=6$,
$N=4$ then $P=12$,
$N=5$ then $P=20$,
$N=6$ then $P=30$, etc.

It is also possible to have codes within this class where P can be any selected number, however, before explaining how to produce the general case wherein P may have any value, the special cases wherein P is 6, 12, 20, etc., will be discussed. To produce the codes in such instances, a table having words N bits long is constructed. Thus, when N is 3 and P is 6 the table produced is as shown:

TABLE II

| Sector I | 0 | 0 | 1 |
|---|---|---|---|
|  | 0 | 1 | 0 |
| Sector II | 1 | 0 | 1 |
|  | 0 | 1 | 1 |
| Sector III | 1 | 1 | 0 |
|  | 1 | 0 | 0 |

Note that the code consists of $P=6$ words, that there are $N=3$ sectors each having $N-1=2$ words each. The code is then obtained by the bit sequence in any column: i.e., 001011. These six bits, when arranged in a circle, will close and be progressive.

When N is 4 and P is 12 the following table having words N bits long is produced:

TABLE III

| Sector I | 0 | 0 | 0 | 1 |
|---|---|---|---|---|
|  | 0 | 0 | 1 | 0 |
|  | 0 | 1 | 0 | 0 |
| Sector II | 1 | 0 | 0 | 1 |
| Sector II | 0 | 0 | 1 | 1 |
|  | 0 | 1 | 1 | 0 |
| Sector III | 1 | 1 | 0 | 1 |
|  | 1 | 0 | 1 | 1 |
|  | 0 | 1 | 1 | 1 |
| Sector IV | 1 | 1 | 1 | 0 |
|  | 1 | 1 | 0 | 0 |
|  | 1 | 0 | 0 | 0 |

If the bits in any column are taken in sequence and then joined beginning to end, a closed progressive code is produced. In Table III the code sequence is 000 100 110 111.

If the two code sequences resulting from Tables I and II are examined, it is seen that the code sequence includes $N-1$ "0" bits followed by further groups of bits each having an additional "1" bit until the Nth group which consists of $N-1$ "1" bits. Knowing this, the code sequence for $N=7$ can be set forth as 000000, 100000, 110000, 111000, 111100, 111110, 111111. The commas have been added to break the sequence into N groups of $N-1$ bits each.

Thus, for the special case where $P=(N)(N-1)$, a table is constructed having a first column composed of N sectors of $N-1$ bits each, the first $N-1$ bits (first sector) consists of all "0" bits. In the next sector a "1" bit is introduced into the topmost of the $N-1$ bit positions. In each succeeding sector a further "1" is added to the $N-1$ bit positions until the Nth sector which consists of all "1" bits. This results in a column of $(N)(N-1)$ or P bits. A second column is then constructed by taking the first bit of the first sector of the first column (a "0" bit by definition), shifting the column up one bit position so that the second bit now becomes the first bit, and then reinserting the removed first bit into the last bit position of the Nth sector. Successive columns are formed by taking the first bit of the preceding column, shifting the column up one bit, and reinserting the first bit into the last bit position. This is repeated until N columns are formed. As previously stated, if the last bit position of each column were brought around next to the first bit position of the column, a closed loop of P bits would be formed and the sequence of bits of each of the columns would be identical. This bit sequence serves as the closed progressive code for the rotary element for the special case where P happens to be one of exact multiples of $(N)(N-1)$.

With the special case of the closed progressive code as described, N sensors are employed; that is, the number of sensors S is equal to N. Thus, there will be P different code words each being N bits long. The P different code words are set forth as the P rows of the table thus formed by the N columns of P bits length just described. The first $N-1$ code words (the first $N-1$ rows) form the first sector and each additional $N-1$ code words form succeeding sectors until the last $N-1$ code words form the Nth or terminating sector.

The above-described class of codes has the important feature that, for any given angular position of the rotary element containing the code, and for any new desired angular position (angular positions are represented by the P different code words of N bits length, hereinafter referred to as addresses) the rotational direction (clockwise or counterclockwise) providing the shortest distance between the present and desired addresses may be determined.

In order to accomplish this the sector number of the addresses must be known. First the sector number of the present address is subtracted from the sector number of the desired address. If this subtraction does not equal zero, the shortest rotational distance is determined as follows:

(1) Determine the sign of the difference resulting from subtracting the present address sector from the desired address sector (either $+$ or $-$).
(2) Compare the absolute magnitude of the difference to one-half N. The result will be either:
(desired sector—present sector)$<N/2$ or desired sector—present sector)$\geq N/2$ The rules are then:

Rule I. When the sign is $+$ and (desired sector—present sector)$<N/2$ or the sign is $-$ and (desired sector—present sector)$\geq N/2$ then rotate forward to the desired address.

Rule II: When the sign is $+$ and (desired sector—present sector)$\geq N/2$ or the sign is $-$ and (desired sector—present sector)$<N/2$ then rotate backward to the desired address.

Rule III: When the subtraction of the present address from the desired address equals zero it means the addresses are in the same sector. In this instance if the two addresses are in the first to the $(N-1)$th sector, a "01" pattern is sought in both the present address and the desired address. If the desired address has the "1" bit of the "01" combination in a lower order bit position than the "1" bit of the "01" combination of the present address (i.e., further to the left in the address), than the present address, then forward rotation is required. If the "1" bit of the "01" combination of the desired address is in a higher order bit position, then backward rotation is required.

If the two addresses are in the Nth (terminating) sector, then the same is true except that "01" bit combinations are sought and the relative order of the "01" bits in the combinations are compared.

As an example, consider the Table I. The thirty rows of six bit words represent the thirty addresses read out by the sensors 12-1 though 12-6 in FIG. 1A. Consider that a progression from the top row to the bottom row is the forward direction. This corresponds to a counterclockwise rotation of rotary element 10 in FIG. 1A. Presume that the present address of the rotary element is 100011, which is the twelfth row and is located in sector III. Presume also that it is desired to move to address 001100. This is the ninth row and lies in sector II. The subtraction of the present sector number from the desired sector number is 2—3=—1. The absolute magnitude of the difference (which is 1) is less than $N/2$ (which is 3) and therefore rule II indicates that backward (clockwise) movement is required. Checking this decision with Table I it is seen that the distance in the backward direction is three rows whereas the distance in the forward direction is twenty-seven rows.

If the present address is 100111 (eighteenth row, sector IV) and the desired address is 111110 (twenty-sixth row, sector VI) the subtractive difference between the sectors is +2 which is less than $N/2$. Rule I applies and the movement is forward (counter clockwise), which by consulting Table I is a distance of seven rows rather than twenty-two rows in the backward direction.

If the present address is 111011 (row 22) and the desired address is 011111 (row 25) which are both in sector V, the difference between sector numbers is zero. In this case, the sector not being the Nth sector (sector VI), the "1" bit of the "01" combination of the present address is in the fifth bit position and the "1" bit of the "01" combination of the desired address is in the second bit position. By rule III it is seen that forward rotation is required and this is confirmed by consulting Table I.

If the present address is 110000 (row 29) and the desired address 111100 (row 27), it is seen that both addresses are in sector VI and the difference in sector numbers is zero. Sector VI being the Nth sector, the "10" combinations are looked for with the "0" of the "10" of the desired address being in the fifth bit position and the "0" of the "10" combination of the present address being in the third bit position. Thus, rule III indicates that backward rotation is required. This is confirmed by Table I.

The previous discussion was limited to the special cases where $P=N(N—1)$ and N is an integer greater than one. Thus P, in the special case, can be equal to 2, 6, 12, 20, 30 . . . . It is most likely that in designing a system a P other than the aforesaid values is desired. In such instances a code following the principles of the present invention can be employed by a modification of the special case code according to specific rules.

Each of the codes produced by the aforesaid rules can be increased by two words. It is noted in Table I that a word having six "1" bits or six "0" bits is not included. An additional word having six "1" bits can be added after the last word (word 25) in sector V to increase the code to $P=31$ without altering the fact that the code closes on itself. Likewise a word having six "0" bits can be added after the last word (word 30) in sector VI to also produce a code wherein $P=31$. Also, both additional words could be included to produce a code wherein $P=32$. The ability to add two more code words holds true for any code formed wherein N is an integer and it does not affect the previously described qualities of the closed code. Thus, a further variable "K" exists which represents the additional words. Since none, one, or both additional code words may be necessary, the variable K may take the value 0, 1, or 2. The way the additional code words are produced is that the first column of the code table is selected. The first column is the one having all "0" in the first sector and is column 12–1 in Table I. If K is 1 a "0" bit is added after the last bit of the last sector, and if K is 2 a "1" bit is also added before the first bit in the last (terminating) sector. It is therefore possible to have closed codes of lengths P, $P+1$, and $P+2$ and the expression for P now becomes:

$$P=(N)(N-1)+K \qquad (2)$$

where K can be 0, 1, or 2.

Thus far it is now possible to have closed codes having bit lengths of 2, 3, 4, 6, 7, 8, 12, 13, 14, 20, 21, 22, etc., however, a general rule for producing a code wherein P is any number has not yet been discussed. To produce a code where P is any number, the closed code for a special case P of greater length is set forth and then selectively shortened or truncated. Thus, if a code having a P of 17 is desired, the code for $P=20$ (the special case of (5)(4) is produced and then selectively truncated.

The resultant code will have X sectors rather than $N-1$ sectors preceding the last sector and may include less than $N-1$ words in the last ($X+1$ sector. The expression for this general case is:

$$P=X(N-1)+X+K \qquad (3)$$

It can be seen that this expression is valid for the special case because in the special case the number of sectors preceding the last sector is $N-1$, thus for the special case $X=N-1$, and $K=0$, therefore expression (3) becomes:

$$P=(N-1)(N-1)+(N-1) \qquad (4)$$

which is $$P=N^2-2N+1+N-1$$
$$P=N^2-N=N(N-1) \qquad (5)$$

It is seen that expression (5) is the same as expression (1) and therefore the general expression for a P of any length is represented by expression (3).

Expression (3) can be rewritten as:

$$P=XN+K$$

$$X=\frac{P-K}{N} \qquad (6)$$

by definition K may be 0, 1, or 2 and X must be less than N and X must be an integer because it represents the number of sectors preceding the last sector in the code and, as will be demonstrated, X also represents the number of code words in the last sector exclusive of the additional K code words.

Expression (6) is applied as follows. Consider that a P of 17 is desired. The expression becomes:

$$X=\frac{17-K}{N}$$

With a K of 0, X cannot be an integer. With a K of 1, N can be 4 and X becomes 4. However X, by definition, must be less than N and also the maximum P possible with an N of 4 is $P=12$. Thus, a K of 2 is used and N becomes 5 and X is 3. The code for an N of 5 is shown in Table IV.

TABLE IV

|  |  |  |  |  |  | Word |
|---|---|---|---|---|---|---|
| Sector I | 0 | 0 | 0 | 0 | 1 | 1 |
|  | 0 | 0 | 0 | 1 | 0 | 2 |
|  | 0 | 0 | 1 | 0 | 0 | 3 |
|  | 0 | 1 | 0 | 0 | 0 | 4 |
| Sector II | 1 | 0 | 0 | 0 | 1 | 5 |
|  | 0 | 0 | 0 | 1 | 1 | 6 |
|  | 0 | 0 | 1 | 1 | 0 | 7 |
|  | 0 | 1 | 1 | 0 | 0 | 8 |
| Sector III | 1 | 1 | 0 | 0 | 1 | 9 |
|  | 1 | 0 | 0 | 1 | 1 | 10 |
|  | 0 | 0 | 1 | 1 | 1 | 11 |
|  | 0 | 1 | 1 | 1 | 0 | 12 |
| Sector IV | 1 | 1 | 1 | 0 | 1 | 13 |
|  | 1 | 1 | 0 | 1 | 1 | 14 |
|  | 1 | 0 | 1 | 1 | 1 | 15 |
|  | 0 | 1 | 1 | 1 | 1 | 16 |
| Sector V | 1 | 1 | 1 | 1 | 0 | 17 |
|  | 1 | 1 | 1 | 0 | 0 | 18 |
|  | 1 | 1 | 0 | 0 | 0 | 19 |
|  | 1 | 0 | 0 | 0 | 0 | 20 |

The application of Equation 6 resulted in X of 3, therefore, the first three sectors of Table IV are used, and the first three words (words 9, 10, and 11) of sector IV are retained, producting a shortened code as follows:

TABLE V

|  | | | | | | | Word |
|---|---|---|---|---|---|---|---|
| Sector I | 0 | 0 | 0 | 0 | 1 | 1 | 1 |
|  | 0 | 0 | 0 | 1 | 1 | 0 | 2 |
|  | 0 | 0 | 1 | 0 | 0 | 1 | 3 |
|  | 0 | 1 | 0 | 0 | 0 | 0 | 4 |
| Sector II | 1 | 0 | 0 | 0 | 1 | 1 | 5 |
|  | 0 | 0 | 0 | 1 | 1 | 0 | 6 |
|  | 0 | 0 | 1 | 1 | 0 | 0 | 7 |
|  | 0 | 1 | 1 | 0 | 0 | 1 | 8 |
| Sector III | 1 | 1 | 0 | 0 | 1 | 1 | 9 |
|  | 1 | 0 | 0 | 1 | 1 | 0 | 10 |
|  | 0 | 0 | 1 | 1 | 1 | 0 | 11 |
|  | 0 | 1 | 1 | 1 | 0 | 0 | 12 |
| Sector IV | 1 | 1 | 1 | 0 | 1 | 1 | 13 |
|  | 1 | 1 | 0 | 1 | 1 | 1 | 14 |
|  | 1 | 0 | 1 | 1 | 1 | 1 | 15 |

The application of Equation 6 also indicated that a K of 2 is necessary, therefore, a "0" bit is added after the last bit in the terminating sector of the first column of Table V, and a "1" bit is added before the first bit in the terminating sector of the first column of Table V. The first column of Table V now will appear as follows in Table VI:

TABLE VI

Sector I ---------------------------------- 0
0
0
0
Sector II ---------------------------------- 1
0
0
0
Sector III ---------------------------------- 1
1
0
0
Sector IV ---------------------------------- [1]1
1
1
1
[1]0

[1] Added bit.

Since $N=S=5$, a rotary device using the closed code of Table VI will have five sensors which will read five bits at a time and will sequence by one bit at a time. Taking the bits in Table VI in sequence five at a time, the following code words are generated:

TABLE VII

|  | | | | | | Word |
|---|---|---|---|---|---|---|
| Sector I | 0 | 0 | 0 | 0 | 1 | 1 |
|  | 0 | 0 | 0 | 1 | 0 | 2 |
|  | 0 | 0 | 1 | 0 | 0 | 3 |
|  | 0 | 1 | 0 | 0 | 0 | 4 |
| Sector II | 1 | 0 | 0 | 0 | 1 | 5 |
|  | 0 | 0 | 0 | 1 | 1 | 6 |
|  | 0 | 0 | 1 | 1 | 0 | 7 |
|  | 0 | 1 | 1 | 0 | 0 | 8 |
| Sector III | 1 | 1 | 0 | 0 | 1 | 9 |
|  | 1 | 0 | 0 | 1 | 1 | 10 |
|  | 0 | 0 | 1 | 1 | 1 | 11 |
|  | 0 | 1 | 1 | 1 | 0 | 12 |
| Sector IV | 1 | 1 | 1 | 1 | 0 | 13 |
|  | 1 | 1 | 1 | 0 | 0 | 14 |
|  | 1 | 1 | 0 | 0 | 0 | 15 |
|  | 1 | 0 | 0 | 0 | 0 | 16 |
|  | 0 | 0 | 0 | 0 | 0 | 17 |

It is seen that the use of the closed code of Table VI results in a P of 17 with 17 different code words (Table VII). Sector IV is now the new terminating sector and will be referred to as the $N^1$th sector.

For purposes of explanation, another example will be shown wherein a code having a P of 18 is desired. Apply Equation 6:

$$X = \frac{18-K}{N}$$

If K is 1, X cannot be an integer, and if K is 2, N can be 4 but this will make X also 4 and therefore not less than N. Thus, K is 0 (no additional words will be necessary) and N is 6, resulting in an X of 3. This means that the bits in the first three sectors and the first three bits of the fourth sector in the first column of the code wherein N is 6 is used. When N is 6, P is 30 and the code for N equal to 6 is set forth in Table I. The bits in the first three sectors and the first three bits in the fourth sector of the first column (12–1) of Table I results in the eighteen bit code 000001000011000111.

Since N is 6, S=6 and the code bits are taken six at a time which results in the following eighteen words:

TABLE VIII

| Sector I | 0 | 0 | 0 | 0 | 0 | 1 |
|---|---|---|---|---|---|---|
|  | 0 | 0 | 0 | 0 | 1 | 0 |
|  | 0 | 0 | 0 | 1 | 0 | 0 |
|  | 0 | 0 | 1 | 0 | 0 | 0 |
|  | 0 | 1 | 0 | 0 | 0 | 0 |
| Sector II | 1 | 0 | 0 | 0 | 0 | 1 |
|  | 0 | 0 | 0 | 0 | 1 | 1 |
|  | 0 | 0 | 0 | 1 | 1 | 0 |
|  | 0 | 0 | 1 | 1 | 0 | 0 |
|  | 0 | 1 | 1 | 0 | 0 | 0 |
| Sector III | 1 | 1 | 0 | 0 | 0 | 1 |
|  | 1 | 0 | 0 | 0 | 1 | 1 |
|  | 0 | 0 | 0 | 1 | 1 | 1 |
|  | 0 | 0 | 1 | 1 | 1 | 0 |
|  | 0 | 1 | 1 | 1 | 0 | 0 |
| Sector IV | 1 | 1 | 1 | 0 | 0 | 0 |
|  | 1 | 1 | 0 | 0 | 0 | 0 |
|  | 1 | 0 | 0 | 0 | 0 | 0 |

It may be noted that when a P of 18 is desired, the use of Equation 6 also is satisfied by an N of 9 and an X of 2. This means that the bits in the first two sectors and the first two bits in the third sector of the first column of the code wherein N is equal to 9 is valid. This results in an eighteen bit code 000000001000000011. This code must be taken nine bits at a time and therefore the system employing it will require nine sensors. Since the same result is more efficiently accomplished with six sensors as shown in Table VIII, the lower value of N will be the determining factor.

Using the aforesaid Equation 6 a closed code following the principles of the present invention can be developed for any value of P. The following closed codes have been worked out by way of example for values of P from two through twelve.

| P | N | K | X | Code |
|---|---|---|---|---|
| 2 | 2 | 0 | 1 | 01 |
| 3 | 2 | 1 | 1 | 001 |
| 4 | 2 | 2 | 1 | 0110 |
| 5 | 3 | 2 | 1 | 00110 |
| 6 | 3 | 0 | 2 | 001011 |
| 7 | 3 | 1 | 2 | 0010110 |
| 8 | 3 | 2 | 2 | 00101110 |
| 9 | 4 | 1 | 2 | 000100110 |
| 10 | 4 | 2 | 2 | 0001001110 |
| 11 | 5 | 1 | 2 | 00001000110 |
| 12 | 4 | 0 | 3 | 000100110111 |

It is noted that although a code with a P of twelve is possible using four sensors, a code with a P of eleven requires at least five sensors. The fact that a greater number of sensors are sometimes required for a smaller P than are required for a larger P will be true of other particular values of P and can be determined by employing Equation 6.

From the preceding discussion it is seen that various conditions are possible when a code is generated. The code may be of the special case where P is equal to $(N)(N-1)$ where K is 0, or the special case where $K=1$, or the special case where $K=2$. The code may also be of the type where one or more sectors are truncated and where $K=0$, or truncated where $K=1$, or truncated where $K=2$. In each of these mentioned cases a present address and a desired address may be located in different sectors and either the present or the desired address may be located in the terminating (Nth or $N^1$th) sector. The present and desired addresses may also be located in the same sector and such same sector may be the terminating (Nth or $N^1$th) sector. In devising a system employing the code of the present invention, the code length P would be first determined and the system would be arranged to operate with the resultant code type (i.e., general or truncated, $K=0$, 1 or 2). The present embodiment shown in the drawings is a general system useful with any of the aforesaid cases.

In FIGS. 1A through 1F, an embodiment of the code generating system is shown. The system includes a rotary element which is located at a present address and an input means for providing the desired address to which the rotary element is to be driven. Associated logic circuits are provided to determine whether the rotary element is to be driven forward or backward in accordance with the shortest distance between the desired address and the present address. As previously stated, it is possible that the code may be special (N sectors) or truncated ($N^1$ sectors). It is also possible that the present and the desired addresses are located in different sectors and that either the present or desired address is in the terminating (N or $N^1$) sector. It is also possible that the present and desired addresses are both located in the same sector, and such same sector might be the terminating (N or $N^1$) sector. It is also possible, depending on the value of P, that K may be 0, 1, or 2. The embodiment shown in the figure is shown having a P of 30 so that N equals S which equals six and K equals zero. However, the logic circuit shown in the figures is designed for a P of any value and for present and desired addresses which may be located in different sectors or the same sector including the terminating sector.

It was previously stated that to determine the shortest distance between addresses the present address sector is subtracted from the desired address sector and the difference is compared to $N/2$ (or $N^1/2$). The sign of the remainder and the magnitude of the remainder determines the direction of rotation. The direction of rotation is determined as follows:

| Sign of Remainder | Remainder>N/2 | Direction |
| --- | --- | --- |
| + | No | Forward (counterclockwise). |
| − | Yes | Forward. |
| + | Yes | Backward (clockwise). |
| − | No | Backward. |

If the desired address and the present address are in the same sector, then the remainder will be zero. In such instance the addresses themselves rather than the sector must be considered, and in every sector but the last (Nth) sector it is a quality of the code that only one "01" bit combination is present, and that the "01" bit combination in each word is located further to the left as the code progresses in the forward direction; that is, the "01" combination is located in the $S-1$ and S bit positions in the first word in the sector, and ultimately shifts to the first and second bit positions in the last word in the sector (see Tables I, II, III). If the desired address and the present address are both in the terminating sector the same is true except that the bit combination is "10." The terminating sector is identifiable in that it is the only sector that has both a "1" bit in the first position and an "0" bit in the Sth bit position except when $K=1$ or $K=2$.

Referring again to the figures, an embodiment of a code generating system is shown including assorted logic circuits for determining whether the rotary element 10 will travel clockwise or counterclockwise when moving from a present address to a desired address. The rotary element 10 includes binary code indicia thereon which, as previously explained, may be in the form of magnetic marks, optical windows, mechanical grooves or the like disposed in circular fashion. In the figure the binary code indicia is symbolically represented by the binary values manifested thereby. The code described has a length P of 30 and an N of 6, and 6 sensors 12–1 through 12–6 are included which provide a signal representative of the binary value of the position proximate thereto (the present address). In the present system a binary 1 will be represented by positive voltage and a binary 0 will be represented by zero voltage. Thus, in FIG. 1A the rotary element 10 is located at present address represented by the binary word "000001" and consequently the output from sensors 12–1 through 12–5 will be zero volt and the output of sensor 12–6 will be a positive voltage. The outputs from sensors 12–1 through 12–6 are applied via leads 10–1 through 10–5 as inputs to a Kirchhoff adder circuit 13. Leads 10–1 through 10–6 are respectively connected through diodes 10–7 through 10–12, the function of which will be later explained. The Kirchhoff adder circuit 13 includes a separate resistor coupled to the output of each sensor 12–1 through 12–6. The resistors, labelled 13–1 through 13–6, are equally valued and are connected to a source of potential 13–7 through a separate resistor 13–8. Kirchhoff added circuit 13 provides an output signal which is an analog signal representative of the number of 1 bits from sensors 12–1 through 12–6. The analog output from Kirchhoff adder 13 is connected through a diode 14 (FIG. 1B) which will be later explained and is applied as an input to a differential amplifier 15 (FIG. 1C). The new location (desired address) to which the rotary element 10 is to be moved is set forth also in terms of a 6 bit binary word from signal source 16 (FIG. 1C) on leads 16–1 through 16–6 via respective diodes 16–7 through 16–12 to be later explained. Signal source 16 is representative of a great variety of control devices, the type of which will depend on the environments in which the rotary element 10 is placed. The signals from signal source 16 on leads 16–1 through 16–6 are applied as inputs to a second Kirchhoff adder 17 (FIG. 1C) which is identical to Kirchhoff adder 13 and includes equal valued resistors 17–1 through 17–6, a voltage source 17–7 and a separate resistor 17–8. The output of Kirchhoff adder 17 is an analog signal representative of the number of "1" bits from signal source 16 and is applied through a diode 18 (FIG. 1C) to be later explained and applied as the other input to differential amplifier 15.

In all code sectors except the terminating sector the sum of the number of "1" bits in each word in the sector is the same as the number of the sector. Thus, the analog signal from Kirchhoff adder 13 (FIG. 1A) is representative of the sector number of the present address and the analog signal from Kirchhoff adder 17 (FIG. 1C) is representative of the sector number of the desired address, provided that neither address is the terminating sector.

Referring to Table I it is seen that in sector I all code words have one "1" bit, in sector II all code words have two "1" bits, in sector III all code words have three "1" bits and so on with the exception of the terminating sector. Thus, the analog output signal of differential amplifier 15 (FIG. 1C) is also representative of the difference resulting from subtracting the present address sector from the desired address sector.

Quantizing circuit 19 (FIG. 1D) is set at value equal to $N/2$ which in the present example is a value of 3. If the output of differential amplifier 15 (FIG. 1C) is equal to or greater than $N/2$ the output of quantizing circuit 19 on lead 23 (FIG. 1D) will be a "1" bit. If the output signal from differential amplifier 15 is less than $N/2$ the output of quantizing circuit 19 on lead 23 will be a "0" bit. Quantizing circuits 20 (FIG. 1D) is set at a value equal to zero such that when the output from differential amplifier 15 is positive (i.e., equal to or above zero), the output signal from quantizing circuit 20 will be a "1" bit. When the output from differential amplifier 15 is negative or below zero the output from quantizing circuit 20 will be a "0" bit. Thus, the output from quantizing circuit 19 on lead 23 indicates whether the remainder produced by the subtraction of the present address sector from the desired address sector is greater than or equal to, or less than the value $N/2$ and the output of quantizing circuit 20 on lead 24 (FIG. 1D) indicates whether the subtraction from the present address sector from the desired address sector is positive or negative.

The decision whether to drive rotary element 10 (FIG. 1A) forward or backward can be restated in terms of the binary output signals from quantizing circuits 19 and 20 as follows:

| Circuit 19 | Circuit 20 | Direction |
|---|---|---|
| 1 | 0 | Forward |
| 0 | 1 | Forward |
| 1 | 1 | Backward |
| 0 | 0 | Backward |

If the output signal from quantizing circuit 19 is a "1" bit and the output signal from quantizing circuit 20 is a "0" bit the rotary element 10 should be driven forward (counterclockwise). Thus, the output signal from quantizing circuit 20 is inverted by inverter circuit 25 (FIG. 1D) and applied along with the output signal from quantizing circuit 19 to an "AND" circuit 26 (FIG. 1D) which will produce an output signal on such occasion which will result in an output from "OR" circuit 27 (FIG. 1D). Also, if the output signal from quantizing circuit 20 is a "1" bit and the output signal from quantizing circuit 19 is a "0" bit the rotary element 10 should also be driven forward, therefore, the output signal from quantizing circuit 19 is inverted by inverter circuit 28 (FIG. 1D) and applied with the output signal from quantizing circuit 20 to an "AND" circuit 29 (FIG. 1D) which on such occasion will also result in an output signal from "OR" circuit 27. The output from "OR" circuit 27 is therefore a "forward" signal.

If, on the other hand, the output signals from quantizing circuits 19 and 20 are both "1" bits the rotary element 10 should be driven backward (clockwise). In such instance the outputs from quantizing circuits 19 and 20 are applied to "AND" circuit 30 (FIG. 1D), the output signal of which will be passed through "OR" circuit 31 (FIG. 1D). Also, if the output signals of quantizing circuits 19 and 20 are both "0" bits, the rotary element 10 should also be driven backward. In such instance the outputs from quantizing circuits 19 and 20 are respectively inverted by inverter circuits 28 and 25 (FIG. 1D) and produce an output signal from "AND" circuit 32 (FIG. 1D) which is passed through "OR" circuit 31 (FIG. 1D). The output from "OR" circuit 31 is therefore a "backward" signal.

The aforesaid is based on the presumption that the present and desired addresses are not located in the same sector.

If the present and desired addresses are in the same sector, the outputs from quantizing circuits 19 and 20 should be ignored. When the present and desired addresses are in the same sector the analog output signal from differential amplifier 15 is zero. Quantizing circuit 21 (FIG. 1D) is set at a value $+j$ which is a value slightly above zero yet less than the analog signal produced by a remainder of $+1$ from differential amplifier 15. Quantizing circuit 22 (FIG. 1D) is set at a value $-j$ which is a value slightly below zero yet greater than the analog signal produced by a remainder of $-1$ from differential amplifier 15. An output from differential amplifier 15 below $+j$ will produce a "0" bit output from quantizing circuit 21 which is inverted by inverter circuit 33 (FIG. 1D) and applied as a "1" bit to "AND" circuit 34 (FIG. 1D). If such output signal from differential amplifier 15 is also above the value $-j$ a "1" bit will be produced by quantizing circuit 22 and also applied to "AND" circuit 34. Thus, a zero analog output signal from differential amplifier 15 will result in a "1" bit output signal from "AND" circuit 34 which is inverted by inverter circuit 35 (FIG. 1D) and applied to both "AND" circuit 36 and "AND" circuit 37 (FIG. 1D) thereby degating "AND" circuits 36 and 37. The output from "forward" "OR" circuit 27 is applied to "AND" circuit 36 (FIG. 1D) and the output from "backward" "OR" circuit 31 is applied to "AND" circuit 37 (FIG. 1D) so that if output from differential amplifier 15 is zero (indicating that the present and desired addresses are in the same sector) the "forward" and "backward" signals from "OR" circuits 27 and 31, respectively, are inhibited. The "1" bit from "AND" circuit 34 which is produced when the present and desired addresses are in the same sector is also applied to and conditions "AND" circuits 38 and 39 (FIG. 1D).

A logic circuit 40 (FIG. 1B) is connected to the output leads 10–1 through 10–6 from sensors 12–1 through 12–6 and a logic circuit 60 (FIG. 1C) is connected to the six output leads 16–1 through 16–6 from signal source 16 (FIG. 1C). Logic circuits 40 and 60 determine whether the rotary element 10 will move forward or backward in the case when the present and desired addresses are in the same sector, including the case wherein the present and desired addresses are both in the terminating sector. Logic circuit 40 is associated with the present address and logic circuit 60 is associated with the desired address. Both logic circuits 40 and 60 look for the relative locations of "01" combinations in the addresses if located in non-terminating sectors or the relative locations of "10" combinations if the addresses are in the terminating sector.

The six sensors 12–6 through 12–1 (FIG. 1A) are respectively connected to inverter circuits 41 through 46 (FIG. 1B) in logic circuit 40 via leads 10–6 through 10–1 respectively. The sensor 12–6 is connected along with the output of inverter circuit 42 to an "AND" circuit 47. The sensor 12–5 is connected along with the output of inverter circuit 43 to an "AND" circuit 48, sensor 12–4 is connected along with inverter circuit 44 to "AND" circuit 49, sensor 12–3 is connected along with inverter circuit 45, to "AND" circuit 50, and sensor 12–2 is connected along with inverter circuit 46 to "AND" circuit 51. The outputs of "AND" circuits 47 through 51 are respectively connected to weighted resistors 52 through 56 which are connected together to resistor 57 and potential source 58. Resistors 52 through 56 are weighted such that the output from "AND" circuit 47 is weighted higher than the output of "AND" circuit 48, which is weighted higher than the output from "AND" circuit 49, and so on. Thus, a "01" combination from sensors 12–5 and 12–6 respectively will result in an output signal from "AND" circuit 51 which provides an output signal through resistor 56 and results in an output signal of given magnitude on lead 59. A "01" combination from sensors 12–4 and 12–5 respectively will produce an output signal from "AND" circuit 50, which, through resistor 55, results in a lesser magnitude signal on lead 59. Ultimately, a "01" combination from sensors 12–1 and 12–2 respectively will produce an output signal from "AND" circuit 47 which, through resistor 52, results in a minimum magnitude signal on lead 59. The overall result is that an analog signal is provided on lead 59, the amplitude of which is representative of the relative position of the "01" combination in the present address.

In logic circuit 60 (FIG. 1C) which is connected to signal source 16, a similar arrangement is provided including inverter circuits 61 through 66, "AND" circuits 67 through 71, resistors 72 through 77, potential source 78, and output lead 79. The operation of these elements is essentially the same as the corresponding ones in logic circuit 40. A "01" combination in the desired address from signal source 16 will produce an output signal from the associated one of "AND" circuits 67 through 71 through the associated one of weighted resistors 72 through 76. A "01" combination in the fifth and sixth bit positions of the desired address will provide a maximum analog signal through resistor 72 on output lead 79 and a "01" combination in the first and second bit positions of the desired address will provide a minimum analog signal through resistor 76 on output lead 79, with "01" combinations located therebetween providing suitably weighted output signals through resistors 73, 74, and 75 onto output lead 79. The resistors 72 through 76 have values equal respectively to the resistors 52 through 56 of logic circuit 39 so that the five possible output signals from maximum to minimum on lead 59 have the same values as the five possible output signals from maximum to minimum of lead 79.

Leads 59 and 79 are applied to switching circuit 80 (FIG. 1C) where they are conducted through the blades of ganged switch 81, to a differential amplifier 82 (FIG. 1C) where the analog value of the signal on lead 79 is subtracted from the analog value of the signal on lead 59. This is equivalent to subtracting the "01" combination bit position of the desired address from the "01" combination bit position of the present address. The output signal from differential amplifier 82 will be either positive or negative, and is applied to a quantizing circuit 83 (FIG. 1D) which will provide a "1" bit output signal in response to a positive signal and a "0" bit signal in response to a negative signal. Note that a positive signal from differential amplifier 82 indicates that the "01" combination of the present address is further to the right in terms of bit positions than the "01" combination of the desired address, and that the rotary element 10 should be driven forward (counterclockwise) whereas a negative signal from differential amplifier 82 indicates that the "01" combination of the present address is further to the left in terms of bit position that the "01" combination of the desired address, and that the rotary element should be driven backward (clockwise).

The output signal from quantizer circuit 83 is applied to "AND" circuit 38 and through inverter circuit 84 to "AND" circuit 39. The other input to "AND" circuits 38 and 39 is from the output of "AND" circuit 34 (all in FIG. 1D). It was stated that the output of "AND" circuit 34 will be a "1" bit when the present and desired addresses are in the same sector, therefore, "AND" circuits 38 and 39 will be conditioned and a "1" bit (forward) output signal from quantizer circuit 83 will be gated through "AND" circuit 38 to "AND" circuit 85 and a "0" bit (backward) output from quantizer circuit 83 will be inverted by circuit 84 and then gated through "AND" circuit 39 to "AND" circuit 86.

"AND" circuit 36 may therefore produce a forward signal if the present and desired addresses are in different sectors or "AND" circuit 85 may produce a forward signal if the present and desired addresses are in the same sector. Likewise "AND" circuit 37 may produce a backward signal if the present and desired addresses are in different sectors, or "AND" circuit 86 may produce a backward signal if the present and desired addresses are in the same sector.

The portions of logic circuits 40 and 60 as just described related to the condition when the present and desired addresses are in the same sector. The directions of rotation were determined by the relative location of the "01" combinations and therefore did not pertain to the condition when the present and desired addresses are in the terminating sector. In such instance the relative location of "10" combinations must be determined.

A characteristic of all words in the terminating sector is that a "1" bit appears in the first bit position and a "0" bit appears in the last (Sth) bit position provided that the variable K is equal to zero. Referring to logic circuit 40 (FIG. 1B), it is seen that the output lead from sensor 12-1 on lead 10-1 is connected to "AND" circuit 88. The output lead 10-6 from sensor 12-6 which is inverted by inverter circuit 41 is also connected to "AND" circuit 88. Thus, if the present address is in the terminating sector, "AND" circuit 88 will be gated and a "1" bit output signal provided on lead 89. Referring to logic circuit 60 (FIG. 1C) it is seen that the output lead from the first bit position of the desired address on lead 16-1 is connected to an "AND" circuit 90 and the output lead 16-6 associated with the last bit position is coupled through inverter circuit 61 to "AND" circuit 90. Thus, if the desired address is in the terminating sector, a "1" bit output signal will be provided from "AND" circuit 90 onto output lead 91. Referring to switching circuit 80, the output lead 89 and the output lead 91 are connected to an "AND" circuit 92 so that if the present and the desired addresses are both in the terminating sector, "AND" circuit 92 will be gated and a signal applied to solenoid 93. Solenoid 93, when activated, will switch the blades of double pole switch 81 thereby connecting leads 94 and 95 to the input of the differential amplifier 82. Leads 59 and 79 become disconnected from the input to differential amplifier 82. Therefore, the output from weighted resistors 52 through 56 in logic circuit 40 (FIG. 1B) and the outputs from weighted resistors 72 through 76 in logic circuit 60 become disconnected.

Referring to logic circuit 40 (FIG. 1B), it is seen that the output signal from sensor 12-6 on lead 10-6 is inverted through inverter circuit 41 and applied to an "AND" gate 96 along with the output lead 10-5 from sensor 12-5. The output signal from sensor 12-5 on lead 10-5 is also inverted by inverter circuit 42 and applied to "AND" circuit 97 along with the output lead 10-4 from sensor 12-4. The output signal from sensor 12-4 on lead 10-4 is also inverted by inverter circuit 43 and applied to "AND" circuit 98 along with the output lead from sensor 12-3. The output signal from sensor 12-3 on lead 10-3 is also inverted by inverter circuit 44 and applied to "AND" circuit 99 along with the output lead from sensor 12-2 and the output signal from sensor 12-2 on lead 10-2 is also inverted by inverter circuit 45 and applied to "AND" circuit 100 along with the output lead from sensor 12-1. Thus, it is seen that "AND" circuit 96 is gated by a "10" condition on leads from sensors 12-5 and 12-6, respectively. "AND" circuit 97 is gated by a "10" condition on the output leads from sensors 12-4 and 12-5 respectively and so on down to "AND" circuit 100 which is gated by a "10" condition on the output leads from sensors 12-1 and 12-2, respectively. The output from "AND" circuits 96 through 100 are connected respectively to weighted resistors 101 through 105. The resistors 101 through 105 are weighted such that the output signal across resistor 101 is greater than that across resistor 102, the output signal across resistor 102 is greater than that across resistor 103, and so on down to the output signal across resistor 105 which is minimum. Thus a "10" condition on the output leads from sensors 12-5 and 12-6 will produce an analog output signal on lead 94 which is maximum and "10" conditions from the other sensors will produce incremently smaller output signals until a "10" on the output leads from sensors 12-1 and 12-2 produce a minimum analog signal on output lead 94.

Referring to logic circuit 60 (FIG. 1C) a group of "AND" gates 108 through 112 and a group of weighted resistors 113 through 117 are connected to the six output leads 16-6 through 16-1 from signal source 16 in essentially the same manner as the "AND" gates 96 through 100 and weighted resistors 101 through 105 are arranged in logic circuit 40. The operation of the "AND" circuits 108 through 112 and resistors 113 through 117 are the same as in their corresponding elements in logic circuit 40; that is, a "10" combination in the fifth and sixth bit positions of the desired address will produce a maximum analog output signal on output lead 95 and a "10" combination in the first and second bit positions of the desired address will produce a minimum analog signal on output lead 95 and the "10" combination inbetween will produce correspondingly graduated analog output signals.

Referring to switching circuit 80 (FIG. 1C), it is seen that the output leads 94 and 95 are connected through switch 81 when both the present and desired addresses are in the terminating sector and through switch 81 they are connected to differential amplifier 82 (FIG. 1D). The signal on lead 95 is subtracted from the signal on lead 94 which is essentially the same as subtracting the position of the "10" of the desired address from the position of the "10" combination of the present address. A remainder from differential amplifier 82 which is positive indicates that the rotary element 10 (FIG. 1A) should be driven forward or counterclockwise. If the output signal from differential amplifier is negative, it indicates that the rotary element 10 should be driven backwards or clockwise. The output signal from differential amplifier 82 is applied to quantizing circuit 83 (FIG. 1D). A positive output signal from differential amplifier 82 produces a "1" bit output signal from quantizer circuit 83 and a negative output signal from differential amplifier 82 produces a "0" bit output signal from quantizer circuit 83. The output signal from quantizer circuit 83 is in turn connected directly to "AND" circuit 38 and through inverter circuit 84 to "AND" circuit 39. The outputs of "AND" circuit 38 and 39 are connected respectively to "AND" circuits 85 and 86. Thus, "AND" circuit 85 is conditioned for forward or counterclockwise movements and "AND" circuit 86 is conditioned for backward or clockwise movement.

The description thus far related to the determination of rotational direction for the cases where the present address and the desired address were located in different sectors exclusive of the terminating sector for the truncated or nontruncated case where the variable K was equal to zero. Also covered was the case where the present address and the desired address were located in the same sector including the terminating sector for the truncated and nontruncated situation where the variable K was equal to zero. When the present address and the desired address were located in different sectors the approach was that the number of "1" bits in the address was directly representative of the sector number and a subtraction of the analog of the sum of the "1" bits was made in differential amplifier 15 (FIG. 1C). If either the present address or the desired address but not both is located in the terminating sector, it is no longer true that the number of "1" bits in such address is representative of the sector number. When either the present address or the desired address is located in the terminating sector, a separate anaolg signal will be generated which is representative in magnitude to the number of the terminating sector. The property that the terminating sector will have a "1" bit in the first bit position and a "0" bit in the last bit position will be employed. The output lead from the first bit position of the present address; that is, the output lead 10–1 from sensor 12–1 is coupled to an "AND" circuit 120 (FIG. 1B). The other input to "AND" circuit 120 is connected to the output lead 10–6 from sensor 12–6 via inverter circuit 121. If the present address is in the terminating sector, a "1" bit will be introduced to "AND" circuit 120 directly from sensor 12–1 and a "0" bit introduced to inverter circuit 121 from sensor 12–6 which when inverted thereby will gate "AND" circuit 120. The output of "AND" circuit 120 is used to trigger an analog signal generating circuit 122 (FIG. 1B). The output of analog signal generating circuit 122 is normally zero but when triggered by the output of "AND" circuit 120, it produces an analog output signal equal in magnitude and representative of the number of the terminating sector. For example, in the present example wherein the terminating sector is sector VI, an analog signal representative of the magnitude six is produced and is applied to diode 123 (FIG. 1B). The signal applied to diode 14 from Kirchhoff adder 13 will be less than the analog signal applied through diode 123. Diode 14 will thereby be back-biased and the analog signal representative of the terminating sector will be applied to differential amplifier 15 instead.

Likewise, if the desired address were in the terminating sector, a similar circuit would be activated. The first bit position of the desired address from signal source 16 on lead 16–1 is applied directly to "AND" circuit 124 (FIG. 1C). The sixth bit position of the desired address from signal source 16 on lead 16–6 is applied through an inverter circuit 125 (FIG. 1C) as the other input to "AND" circuit 124. If the desired address were in the terminating sector, the "1" bit in the first bit position directly applied to "AND" circuit 124 and the "0" bit in the last position applied through inverter circuit 125 will gate "AND" circuit 124 and will trigger analog signal generating circuit 126 (FIG. 1C). Analog signal generating circuit 126 is identical to analog signal generating circuit 122. Thus, an analog signal will be passed through diode 127 and will be applied to differential amplifier 15. Thus, if either the present or desired address is located in the terminating sector, an analog signal representative of the number of the terminating sector will be applied to differential amplifier 15 to be compared with the other address which will have an analog signal representative of its sector. If the present and the desired addresses are both located in the terminating sector, the inputs to differential amplifier 15 will both be the same magnitude and a zero output will be generated by differential amplifier 15 which with the aid of quantizer circuits 21 and 22 (FIG. 1D), will result in a "1" bit output from "AND" circuit 34 which when inverted by inverter circuit 35 will degate "AND" circuits 36 and 37 which is normally the case when two addresses are located in the same sector. In such instance the direction of rotation will be determined as previously described by logic circuits 40 and 60.

The previous discussion has covered all possibilities of present and desired movements for the truncated and nontruncated codes with the exception of the case where K is equal to 1 or where K is equal to 2; that is, where the additional words are added. The variable K may be equal to 1 for the truncated case and the nontruncated case and the variable K may be equal to 2 for the truncated and the nontruncated case. In the nontruncated case, when the variable K is equal to 1 a code word or address made up of all zeros is added as the last word in the terminating sector. When the variable K is equal to 2 a code word made up of all "1" bits is added before the first word in the terminating sector. One of the aforesaid cases is already provided for with the existing described circuit; that is, the nontruncated case for the added word having all "1" bits which is inserted before the first word of the terminating sector, i.e., either the present address or the desired address is composed of all "1" bits and the other address is located in some other sector. If the present address is composed of "1" bits and the desired address were located in another sector, the all "1" bit word, when applied to Kirchhoff circuit 13, will produce a maximum analog signal indicating the word is in the terminating sector and if the desired address is composed of all "1" bits and the present address were in some other sector, the all "1" bit word when applied to Kirchhoff circuit 17 would produce a maximum analog signal indicating that the desired word was in the terminating sector and in either case, the logic circuit would perform correctly as previously described.

To summarize the possibilities occurring when either the present address or the desired address is the added word having all "1" bit or all "0" bits is set forth in the following Table IX.

TABLE IX

Nontruncated cases, K=1 or 2

|  | Present Address | Desired Address |
| --- | --- | --- |
| Case one | All "1's" | Nonterminating Sector |
| Case two | Nonterminating sector | All "1's" |
| Case three | All "0's" | Nonterminating Sector |
| Case four | Nonterminating sector | All "0's" |
| Case five | All "1's" | Terminating sector |
| Case six | Terminating sector | All "1's" |
| Case seven | All "0's" | Terminating sector |
| Case eight | Terminating sector | All "0's" |
| Case nine | All "1's" | All "0's" |
| Case ten | All "0's" | All "1's" |

17

Figure 1E:
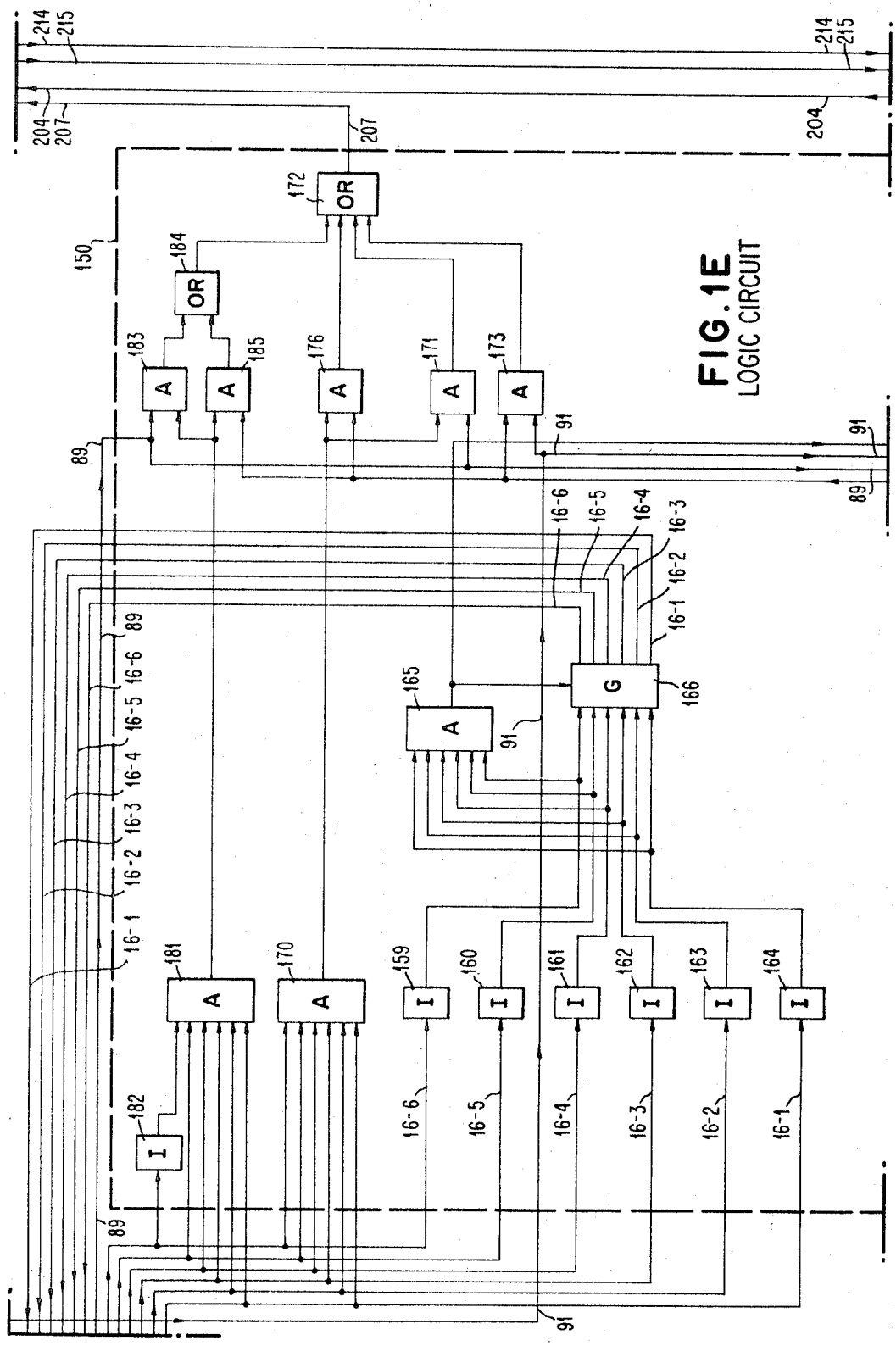
Figure 2:
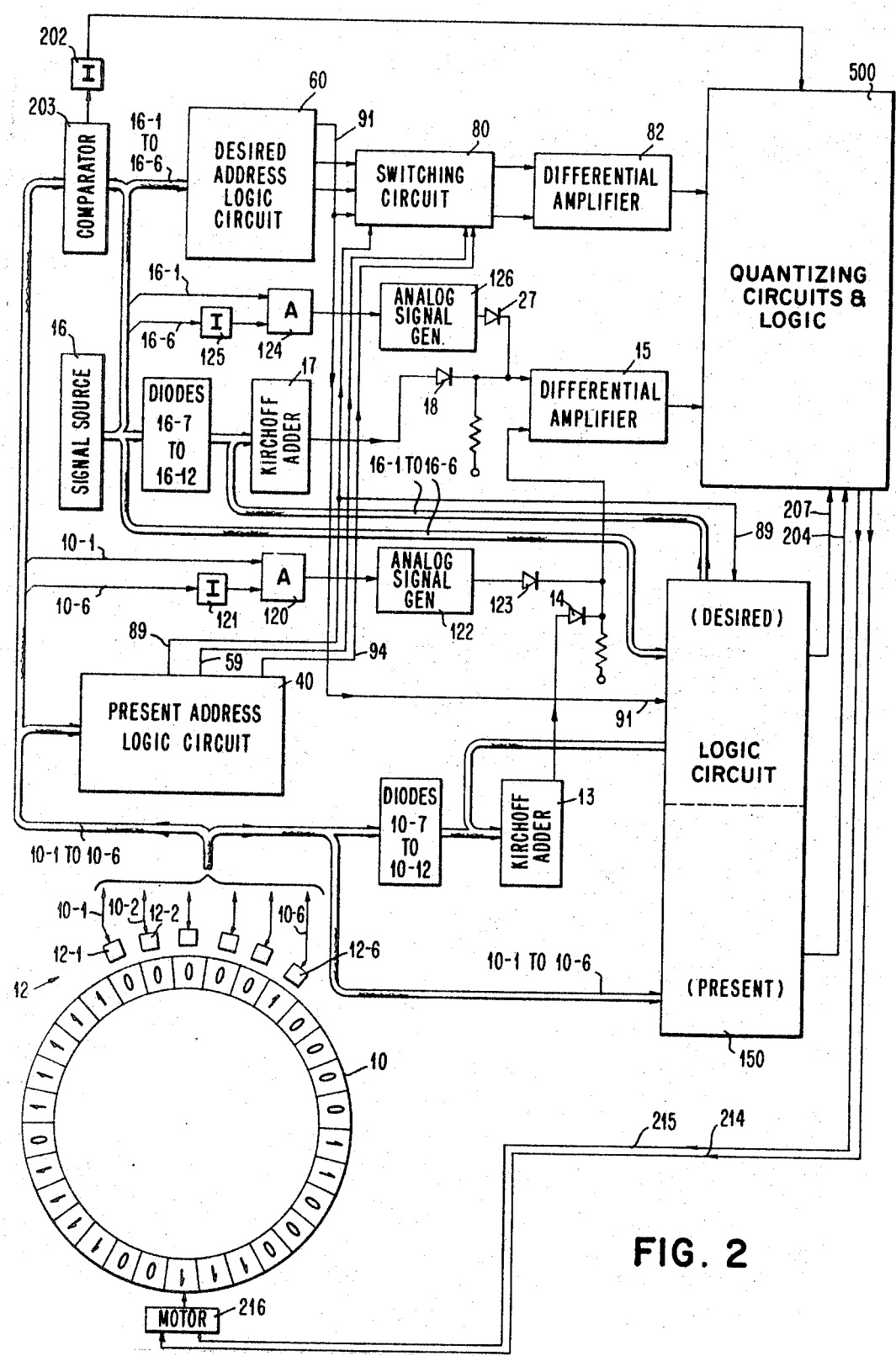
FIG. 2 is an overall schematic diagram of the apparatus of FIGS. 1A–1F.

As previously stated, case one and case two are automatically taken care of by the previously described circuitry. In case one, the present address being all "1" bits, Kirchhoff adder circuit 13 will produce a maximum analog output signal indicating that the present address is in the terminating sector and, for the same reason in case two Kirchhoff adder circuit 17 will produce a maximum analog output signal indicating that the desired address is in the terminating sector. In case three, where the present address is composed of all "0" bits reference is made to logic circuit 150. When the present address is composed of all "0" bits it is by definition located in the terminating sector. Thus, an output signal should be generated indicative of the fact that the all "0" bit address is in the terminating sector. This is accomplished in logic circuit 150 (FIGS. 1E and 1F) by applying each of the output leads 10–1 through 10–6 from sensors 12–1 through 12–6 to an individual one of inverter circuit 151 through 156 (FIG. 1F) which will invert the "0" bits to "1" bits. If the present address were truly composed of all "0" bits, a "1" bit will be present on each output lead from inverter circuits 151 through 156. The output leads from inverter circuits 151 through 156 are connected to a six-way "AND" circuit 157 which if all "1" bits are present at the input thereof, will produce an output signal opening gate circuit 158, thereby gating the "1" bit output signals from inverter circuits 151 through 156 through gate 158 to the input leads of Kirchhoff adder circuit 13 (which is at this time receiving six "0" bit signals of zero voltage). The resultant output from Kirchhoff adder circuit 13 (FIG. 1A) will be a maximum analog output signal indicating that the present address is in the terminating or Nth sector. The remainder of the system will then operate as described previously. The diodes 10–7 through 10–12 (FIG. 1A) in leads 10–1 through 10–6 prevent the output of gate circuit 158 from feeding back into inverters 151 through 156. If the desired address were composed of all "0" bits and the present address were in a different sector, as in case four, the same operation would be performed but on the "0" bit output signals from signal source 16. The six output leads 16–1 through 16–6 (FIG. 1C) are connected in logic circuit 150 as input leads to six inverter circuits 159 through 164 (FIG. 1E). If the desired address were composed of all "0" bits then each of the output leads from inverter circuits 151 through 164 will be "1" bits, six-way "AND" circuit 165 will thus be gated and the output signal therefrom will open gate circuit 166. When gate circuit 166 opens the six "1" bits on the output leads from inverter circuits 159 through 164 are applied as inputs to Kirchhoff adder circuit 17 (FIG. 1C). The output signal from Kirchhoff adder circuit 17 will be a maximum analog signal indicating that the desired address is in the terminating sector. Diodes 16–7 through 16–12 (FIG. 1C) in leads 16–1 through 16–6 prevent the output of gate circuit 166 from feeding back into inverters 159 through 164.

In case five, the present address is composed of all "1" bits and the desired address is also located in the terminating sector. In such instance the all "1" bit word is by definition the first word in the terminating sector and therefore the direction of rotation should always be forward (counterclockwise). In circuit 150 when the present address is composed of all "1" bits there will be an output signal from six-way "AND" circuit 167 (FIG. 1F) which is connected to the sensors 12–1 through 12–6. When the desired address is in the terminating sector a "1" bit signal will be present on output lead 91 from "AND" circuit 90 in logic circuit 40 as previously described. The output of six-way "AND" circuit 167 is applied to "AND" circuit 168 (FIG. 1F) along with lead 91 and "AND" circuit 168 will thus be gated and apply a "1" bit signal to "OR" circuit 169. The "OR" circuit 169 (FIG. 1F) will hereafter be referred to as the forward direction "OR" circuit.

18

On the other hand, if the desired address were composed of all "1" bits and the present address were a word in the terminating sector, the direction of rotation should always be backward (clockwise). Thus, when the desired address is composed of all "1" bits the six output leads 16–1 through 16–6 in logic circuit 150 will have "1" bit signals thereon which, when applied to six-way "AND" circuit 170 (FIG. 1E), will produce an output signal therefrom. When the present address is in the terminating sector a "1" bit signal will be present on the lead 89 from "AND" circuit 88 in logic circuit 40 previously described. The output leads from six-way "AND" circuit 170 and lead 89 are connected to an "AND" circuit 171 (FIG. 1E). When the desired address contains all "1" bits and the present address is in the terminating sector, "AND" circuit 171 will be gated and an output signal applied to "OR" circuit 172 (FIG. 1E). "OR" circuit 172 will be referred to as the backward "OR" circuit.

Figure 1F:
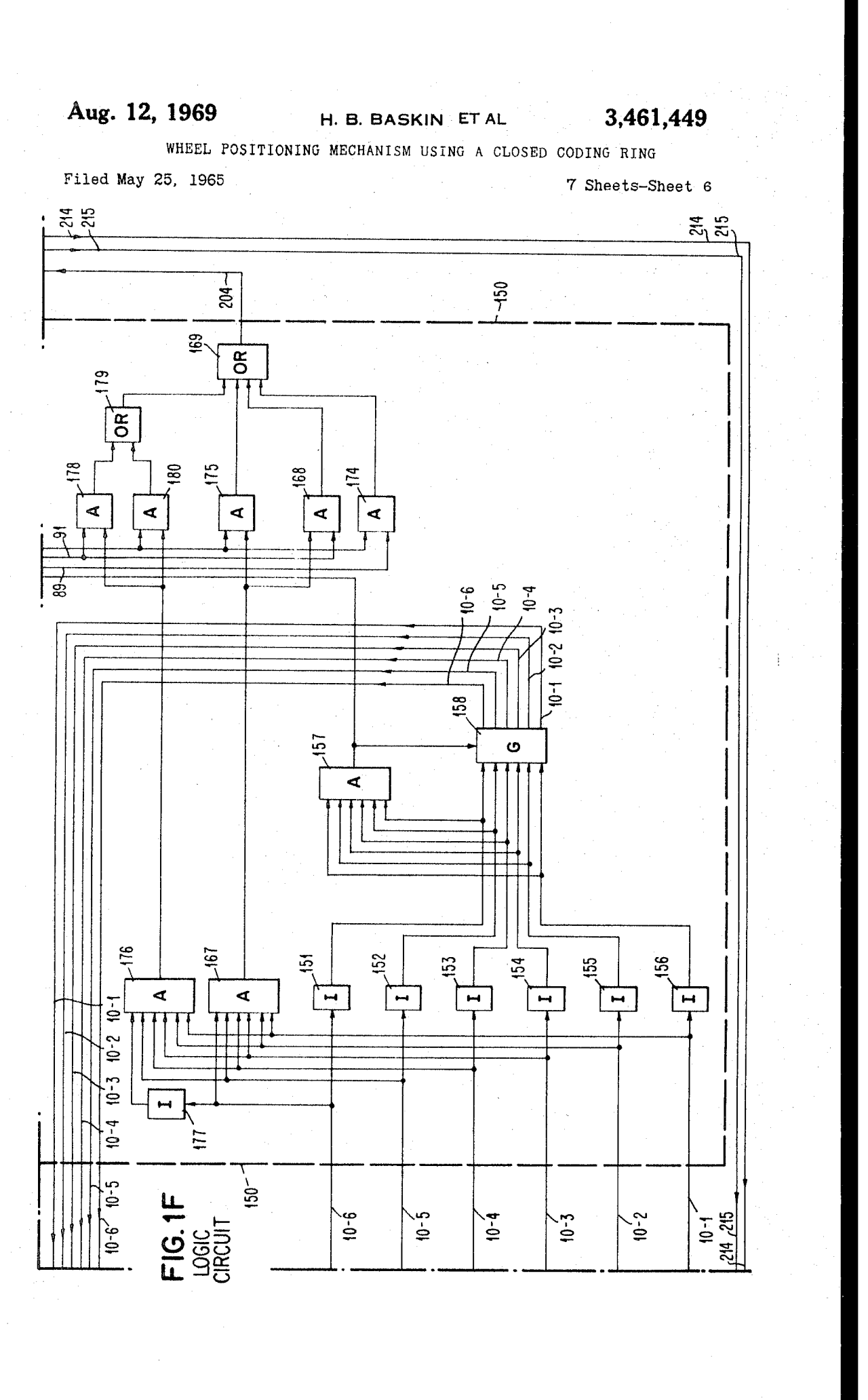

In case seven, the present address is composed of all "0" bits and the desired address is in the terminating sector. Since the all "0" bits word is the last word in the terminating sector the direction of rotation in case seven should always be backward. In logic circuit 150 the output from six-way "AND" circuit 157 (FIG. 1F) will be a "1" bit where the present address is composed of all "0" bits. The output of six-way "AND" circuit 157 is applied to "AND" circuit 173 (FIG. 1E) along with lead 91 which will contain a "1" bit when the desired address is in the terminating sector. Thus, "AND" circuit 173 will be gated and a signal will be applied to backward "OR" circuit 172. In case eight, it is the desired address which is composed of all "0" bits and the present address is in the terminating sector. The all "0" bit word being the last word in the terminating sector, the direction of rotation should always be forward. In logic circuit 150 when the desired address is composed of all "0" bits a "1" bit output signal will be present on the output lead from six-way "AND" circuit 165 (FIG. 1E). This output lead is connected to "AND" circuit 174 (FIG. 1F). Lead 89 which will have a "1" bit thereon when the present address is in the terminating sector is also connected to "AND" circuit 174 which will be gated and an output signal applied to forward "OR" circuit 169. In case nine, the present address is composed of all "1" bits and the desired address is composed of all "0" bits. Since the all "1" bits word is the first word in the terminating sector and the all "0' bits is the last word in the terminating sector the direction of rotation should always be forward. In logic 150 when the present address is composed of all "1" bits a signal is present on the output lead from six-way "AND" circuit 167 (FIG. 1F). When the desired address is composed of all "0" bits an output signal is present on the output lead from six-way "AND" circuit 165 (FIG. 1E). The output from six-way "AND" circuits 165 and 167 are connected to "AND" circuit 175 (FIG. 1F), the output of which is applied to forward "OR" circuit 169. In case ten, the situation is reversed. The present address is composed of all "0" bits and the desired address is composed of all "1" bits. To go from the all "0" bits address, which is the last word in the terminating sector, to the desired address which is the all "1" bits address and is the first word in the terminating sector, backward rotation is required. In logic circuit 150 the output from six-way "AND" circuit 157 (FIG. 1F) will be positive when the present address is all "0" bits and the output of six-way "AND" circiut 170 (FIG. 1E) will be positive when the desired address is composed of all "1" bits. The output of six-way "AND" circuits 157 and 170 are connected to "AND" circuit 176 (FIG. 1E) the output of which is connected to backward "OR" circuit 172. Thus, all the ten cases in Table IX are accounted for.

The cases set forth in Table IX were for the nontruncated case. In the truncated case where K is equal to 2 the all "1" bit word is no longer present and instead a new unique word appears and will have the quality that it will have a "0" bit in the first bit position, a "1" bit in the last position and although it is the last word in the next to last sector it will contain N "1" bits. An example of such word is word 12 in Table VII. If the new unique word is considered as being in the terminating sector when the unique word is the present address and the desired address is in some other sector than the terminating sector, the output from Kirchhoff adder circuit 13 (FIG. 1A) will be an analog signal of magnitude N and the circuit will operate properly. Likewise, if the unique word is the desired address and the other address is in any other sector except the terminating sector the output from Kirchhoff adder circuit 17 (FIG. 1C) will be an analog signal of magnitude N and the system will operate properly. It may be noted that in the truncated case where an all "1" bit word cannot occur, six-way "AND" circuit 170 (FIG. 1E) and six-way "AND" circuit 167 (FIG. 1F) in logic circuit 150 will never be gated.

The two remaining cases to be considered, therefore, are in the truncated case when the present address is the new unique word (such as word 12, Table VII) and the desired address is any word in the terminating sector including the all "0" bit word, or the case when the present address is any word in the terminating sector including the all "0" bit word and the desired address is the new unique word. When the present address is the new unique word and the desired address is in the terminating section the direction of rotation should always be forward and when the present address is in the terminating sector and the desired address is the new unique word the direction of rotation should be backward. A defining property of the new unique word such as word 12 in Table VII is that it is composed of all "1" bits except for the presence of an "0" bit in the first bit position. Thus, in logic circuit 150 if the output lead from sensors 12–2 through 12–6 are directly applied to six-way "AND" circuit 176 (FIG. 1F) and the output from sensor 12–1 is connected through inverter circuit 177 (FIG. 1F) to six-way "AND" circuit 176, "AND" circuit 176 will produce an output signal if and only if the present address is the new unique word in the truncated case. If the desired address is in the terminating sector but is not the all "0" bit word, a signal will be present on lead 91. Thus, the output from six-way "AND" circuit 176 is connected along with lead 91 to "AND" circuit 178 (FIG. 1F), the output of which is connected through "OR" circuit 179 to forward "OR" circuit 169. If the desired address were the all "0" bit word, an output will be present from six-way "AND" circuit 165 (FIG. 1E). Thus, the output from six-way "AND" circuit 165 is connected along with the output from six-way "AND" circuit 176 (FIG. 1F) to "AND" circuit 180 (FIG. 1F) which is connected in turn through "OR" circuit 179 to forward "OR" circuit 169. Thus, if the present address were the new unique word and the desired address were any word in the terminating sector including the all "0" bit word, a forward signal will be produced at the output of "OR" circuit 169.

If the desired address were the new unique word, there will be "1" bits on leads 16–2 through 16–6 from signal source 16 and a "0" bit on output lead 16–1. Leads 16–2 through 16–6 are directly coupled to a six-way "AND" circuit 181 (FIG. 1E) and lead 16–1 is connected through inverter circuit 182 (FIG. 1E) to six-way "AND" circuit 181. Thus, there will be an output from six-way "AND" circuit 181 if and only if the desired word is the new unique word in the truncated case. If the present address is in the terminating sector but it is not the all "0" bit word, an output signal will be present on lead 89. Thus, lead 89 is connected to an "AND" circuit 183 (FIG. 1E) along with the output lead from six-way "AND" circuit 181 and is connected through an "OR" circuit 184 (FIG. 1E) to backward "OR" circuit 172 so that if the present address is in the terminating sector but is not the all "0" bit word and the desired address is the new unique word, an output signal will be produced from "AND" circuit 183 through "OR" circuit 184 to backward "OR" circuit 172. If the present address is the all "0" bit word, a signal will be present on the output from six-way "AND" circuit 157 (FIG. 1F) which is connected along with the output from six-way "AND" circuit 181 (FIG. 1E) to an "AND" circuit 185 (FIG. 1E). The output from "AND" circuit 185 is connected through "OR" circuit 184 to backward "OR" circuit 172. Thus, if the present address is the all "0" bit word and the desired address is the new unique word, a backward signal would be applied through "OR" circuit 172.

In the foregoing discussion it was described how, with the code of the present invention, if the present and desired addresses were located in different sectors, a forward signal might be produced at the output of "AND" circuit 36 (FIG. 1D) or a backward signal might be produced at the output of "AND" circuit 37 (FIG. 1D). If the present and desired addresses were located in the same sector a forward signal might be produced from "AND" circuit 85 (FIG. 1D) or a backward signal might be produced from "AND" circuit 86 (FIG. 1D). When there is an output signal from "AND" circuit 36 there can be no output signal from "AND" circuit 37, "AND" circuit 85, or "AND" circuit 86. Likewise, if there is an output signal from "AND" circuit 37 there can be no output signal from "AND" circuits 36, 85, and 86. If there is an output signal from "AND" circuit 85 there can be no output signal from "AND" circuits 36, 37, or 86 and if there is an output signal from "AND" circuit 86, there can be no output signal from "AND" circuits 36, 37, or 85. "AND" circuits 36 and 85 are connected to "OR" circuit 200 (FIG. 1D) and "AND" circuits 36 and 86 are connected to "OR" circuit 201 (FIG. 1D). The other inputs to "AND" circuits 36, 37, 85, and 86 are obtained via an inverter 202 (FIG. 1C) from a comparator 203 (FIG. 1C). The comparator 203 is connected to both the sensors 12–1 through 12–6 and to the leads 16–1 through 16–6 from signal source 16. When the present address and the desired address are not identical a "0" output is obtained from comparator 203 which is inverted by inverter circuit 202 into a "1" bit and applied as a gating signal to "AND" circuits 36, 37, 85, and 86. In the event that the present address and the desired address are the same, this means that the rotary element 10 has been driven around through the desired position. A "1" bit output signal will be produced upon this occurrence by comparator 203 which inverted by inverter circuit 202 will produce a "0" bit at the inputs of "AND" circuits 36, 37, 85, and 86, thereby degating the circuits and inhibiting any forward or backward signals which may be present.

As previously stated, it is possible to have a forward signal from "OR" circuit 169 (FIG. 1F) of logic circuit 150 or a backward signal from "OR" circuit 172 (FIG. 1E.) It is possible that with an output signal from either "OR" circuit 169 or "OR" circuit 172 an output signal is also present from either "OR" circuit 200 or "OR" circuit 201 (FIG. 1D). In such instance the output from logic circuit 150 should take precedence and the output signals from either "OR" circuit 200 or 201 should be considered spurious. The output signal from "OR" circuit 169 on lead 204 (FIG. 1F) must first be gated with the inverted output from comparator circuit 203 at "AND" circuit 205 (FIG. 1D) and the output signal from "OR" circuit 172 on lead 207 (FIG. 1E) must be likewise gated with the inverted output of comparator 203 at "AND" circuit 208 (FIG. 1D) so that such signals will be employed only when the present address and the desired address differ. The output signal from "AND" circuit 205 (FIG. 1D) is inverted by an inverter circuit 209 (FIG. 1D) and applied along with the output of "OR" circuit 201 to an "AND" circuit 206 (FIG. 1D). The output signal from "AND" circuit 208 is inverted by inverter circuit 210 and applied along with the output signal from "OR" circuit 200 to an "AND" circuit 211 (all in FIG. 1D). Thus, a forward signal from "OR" circuit 169 on lead 204 (FIG. 1F) in logic circuit 150 is inverted by inverter circuit 209 and applied to "AND" circuit 206 to inhibit any possible backward signal from "OR" circuit 201 (FIG. 1D) which may be concurrently present. Likewise, the output from "OR" circuit 172 on lead 207 (FIG. 1E) in logic circuit 150 is inverted by inverter circuit 210 and applied to "AND" circuit 211 as a degating signal to inhibit any possible forward signal from "OR" circuit 200 (FIG. 1D) which may be concurrently appearing. If neither "OR" circuit 169 nor "OR" circuit 172 in logic circuit 150 is producing an output signal, "AND" circuits 211 and 206 will be gated and signal therefrom conducted through "OR" circuit 212, or 213 (FIG. 1D) respectively. If either "OR" circuit 169 or 172 is producing a signal on lead 204 or 207, respectively, the resultant signal from "AND" circuit 205 is conducted directly through "OR" circuit 212 as a forward signal or else the output signal from "AND" circuit 208 is conducted directly through "OR" circuit 213 as a backward signal. The output signal from "OR" circuit 212 on lead 214 (FIG. 1D) is a signal which indicates that the rotary element 10 (FIG. 1A) should be driven in a forward direction. The signal on lead 214 may have been the result of a signal passing through "AND" circuit 35 or a signal passing through "AND" circuit 85 or a signal from lead 204 of logic circuit 150. The output lead from "OR" circuit 213 on lead 215 FIG. 1D) indicates that the rotary element 10 should be driven in a backward direction. The signal on lead 215 may be the result of a signal passing through "AND" circuit 36, a signal passing through "AND" circuit 86, or a signal received on lead 207 from logic circuit 150. Whenever rotary element 10 is at a present position and whenever a separate desired address is entered from signal source 16, a signal will appear on either lead 214 or 215 (FIG. 1D) and remain there until the address of rotary element 10 is the same as the address being requested from signal source 16 at which time the output from comparator 203 will ultimately prevent any signal from appearing on either lead 214 or 215. Thus, the leads 214 and 215 are employed as input leads to a reversible motor 216 (FIG. 1A) for driving rotary element 10. The lead 214 which contains the forward signal could be connected to the motor 216 such that it will drive the motor 216 in a counterclockwise direction and the lead 215 could be connected to the motor 216 such that it drives the motor 216 in a clockwise direction.

The system described hereinabove is designed for present and desired addresses having six bits. It is understood that the number of components in the system will vary depending on the number of bits in the addresses, which in turn depends on the length P of the code employed. For example, if addresses having eight bits are necessary, then Kirchhoff adder circuits 13 and 17 would include eight resistors, and the channels in logic circuits 40, 60, and 150 would be increased to eight with a corresponding increase in the number of circuit elements contained therein. Also, the described system is designed to account for all possible code cases; i.e., truncated, nontruncated, K equals to 0, 1, or 2, so that any length code may be employed. In practice, when a particular code length is selected, it may not be necessary to include some of the circuit elements. For example, if a nontruncated code is employed and K is equal to zero, logic circuit 150 is not required. From the description however, the circuit elements required for any selected code should be obvious to one skilled in the art.

Thus, what has been described is a code and system therefor which permits a rotary element to be accessed and wherein the shortest path between present and desired positions is always selected. The code closes on itself and has no distinct starting point and permits addresses of N bit length to be utilized while only a single code track is required.

While the invention has been particularly shown and described with reference to a preferred embodiment thereof, it will be understood by those skilled in the art that various changes in form and details may be made therein without departing from the spirit and scope of the invention.

What is claimed is:

1. A positioning system comprising rotatable means having a plurality of serially spaced binary coded indicia forming on endless ring thereon, said binary coded indicia being arranged in serial subgroups in numerically designated sectors on said rotatable element, given numbers of said binary coded indicia in combination being representative of the angular position of said rotatable means, readout means proximate to said rotatable means and simultaneously responsive to a first particular given number of said binary coded indicia in combination to provide a first coded address signal representative of the present angular position of said rotatable means, means responsive to said first coded address signal from said readout means for producing a first sector signal representative of the numerically designated sector associated with said first particular given number of said binary coded indicia, signal generating means for producing a given number of binary coded signals to provide a second coded address signal related to a second particular number of binary coded indicia representative of a desired angular position for said rotatable means, means responsive to said second coded address signal from said signal generating means for producing a second sector signal representative of the numerically designated sector associated with said second particular number of binary coded indicia represented by said second coded address signal, means for subtracting said first sector signal from said second sector signal to provide a difference signal representative of the numerical difference between the sector numbers of said sector signal, and logic means responsive to said difference signal from said subtracting means for producing and transmitting a rotational signal to said rotatable means, said logic means also providing direction signals to said rotatable means for rotating to said desired angular position in the direction of least angular distance.

2. A positioning system comprising rotatable means having a plurality of serially spaced binary coded indicia forming an endless ring thereon, said binary coded indicia being arranged in serial subgroups in numerically designated sectors on said rotatable element, given numbers of said binary coded indicia in combination being representative of the angular position of said rotatable means, readout means proximate to said rotatable means and simultaneously responsive to a first particular given number of adjacent ones of said binary coded indicia in combination to provide a first coded address signal representative of the present angular position of said rotatable means, means responsive to said first coded address signal from readout means for producing a first sector signal representative of the numerically designated sector associated with said first particular given number of said binary coded indicia, signal generating means for producing a given number of binary coded signals to provide a second coded address signal related to a second particular number of binary coded indicia representative of a desired angular position for said rotatable means, means responsive to said second coded address signal from said signal generating means for producing a second sector representative of the numerically designated sector associated with said second particular number of binary coded indicia represented by said second coded address signal, means for subtracting said first sector signal from said second sector signal to provide a difference signal representative of the numerical difference between the sector numbers of said sector signal, and logic means responsive to said difference signal from said subtracting means for producing and transmitting a rotational signal to said rotatable means, said logic means also providing direction signals to said rotatable means for rotating in the direction of least angular distance until said second particular number of binary coded indicia are adjacent said readout means.

3. A positioning system according to claim 1 wherein said readout means includes N separate sensors responsive to N of said binary coded indicia to provide a first coded address signal representative of the present angular position of said rotatable means, wherein said signal generating means produces N binary signals to provide a second coded address signal related to a second particular number of binary coded indicia representative of a desired angular position for said rotatable means, and wherein said means responsive to said difference signal from said subtracting means includes means for producing a signal having an analog value corresponding to $N/2$ and means for comparing said difference signal with said signal corresponding to $N/2$, where there are a total of P indicia in said ring and P equals $N(N-1)$, and where said difference signal is an analog value, where said analog values have a predetermined analog to digital relationship.

4. A positioning system comprising rotatable means having a plurality of serially spaced binary coded indicia forming an endless ring thereon, said binary coded indicia being arranged in serial subgroups in numerically designated sectors on said rotatable element, given numbers of said binary coded indicia in combination being representative of the angular position of said rotatable means, readout means proximate to said rotatable means and simultaneously responsive to a first particular given number of adjacent ones of said binary coded indicia in combination to provide a first coded address signal representative of the present angular position of said rotatable means, means responsive to said first coded address signal from said readout means for producing a first analog sector signal representative of the numerically designated sector associated with said first particular given number of said binary coded indicia, signal generating means for producing a given number of binary coded signals to provide a second coded address signal related to a second particular number of binary coded indicia representative of a desired angular position for said rotatable means, means responsive to said second coded address signal from said signal generating means for producing a second analog sector signal representative of the numerically designated sector associated with said second particular number of binary coded indicia represented by said second coded address signal, means for subtracting said first analog sector signal from said second analog sector signal to provide a difference signal having an analog value and polarity representative of the numerical difference between the sector numbers of said sector signal, and logic means responsive to said difference signal from said subtracting means for producing and transmitting a rotational signal to said rotatable means, said logic means also providing direction signals to said rotatable means for rotating to said desired angular position in a given one of two rotational directions as a function of said difference signal.

5. A positioning system according to claim 4 wherein said readout means includes N separate sensors responsive to N of said binary coded indicia to provide a first coded address signal representative of the present angular position of said rotatible means, wherein said signal generating means produces N binary signals to provide a second coded address signal related to a second particular number of binary coded indicia representative of a desired angular position for said rotatable means, and wherein said means responsive to said difference signal from said subtracting means includes means for producing a signal having an analog value corresponding to $N/2$, first means for comparing said difference signal with said signal corresponding to $N/2$, where there are a total of P indicia in said ring and P equals $N(N-1)$, and where said difference signal is an analog value, where said analog values have a predetermined analog to digital relationship, means responsive to said first comparing means for transmitting a rotational signal for rotating said rotational means to said desired angular position in a first direction when said difference signal has a positive polarity and an analog value less than that corresponding to $N/2$ or a negative polarity and an analog value equal to or greater than that corresponding to $N/2$ and for rotating said rotational means to said desired angular position in a second direction when said difference signal has a positive polarity and an analog value equal to or greater than that corresponding to $N/2$ or a negative polarity and an analog value less than that corresponding to $N/2$.

6. A positioning system according to claim 5 wherein said means responsive to said difference signal from said subtracting means includes second means responsive to a difference signal of zero value for comparing the bit positions of said first coded address signal with the bit positions of said second coded address signals, and mean responsive to said second comparing means for producing and transmitting a rotational signal for rotating said rotational means in a first direction in response to a first class of bit pattern comparisons and in a second direction in response to a second class of bit pattern comparisons.

7. A positioning system according to claim 6 wherein said first class of bit pattern comparisons is defined as the class in which the "1" bit of a "01" bit combination of said second coded address is in a lower order bit position than the "1" bit of a "01" bit combination of said first coded address signal, and wherein said second class of bit pattern comparisons is defined as the class in which the "1" bit of a "01" bit combination of said second coded address is in a higher order bit position than the "1" bit of a "01" combination of said second coded address signal.

8. A code system comprising a movable code carrying means containing an array of P serially spaced, binary coded indicia forming an endless ring, N serially spaced sensor means adapted to read out said P binary coded serially spaced indicia in groups of N indicia at a time, wherein $(N)(N-1)$ is equal to P, and where N is a positive integer greater than 1, said array of P coded indicia being arranged in N numerically designated sectors on said code carrying means each of said N sectors including $(N-1)$ indicia, a first one of said N sectors containing $(N-1)$ indicia manifesting a first binary state, a second one of said N sectors containing (N—2) indicia manifesting a first binary state and one indicia manifesting a second binary state, and wherein each progressive sector contains one further indicia manifesting a second binary state and one less indicia manifesting a first binary state than contained in the preceding sector, the Nth sector containing (N—1) indicia manifesting a second binary state.

9. A code system according to claim 8 wherein said first of said N sectors contains (N—1) "0" bit binary indicia in sequence, said second of said N sectors contains a "1" but binary indicia in the first bit position thereof followed by a sequence of (N—2) "0" bit binary indicia, and wherein each progressive of said N sectors contains one further "1" bit binary indicia then contained in the preceding sector followed by a sequence of one less "0" bit binary indicia then contained in the preceding sector, the Nth sector containing a sequence of (N—1) "1" bit binary indicia.

10. A code system according to claim 8 wherein said N sensor means reads out first N given ones of said P binary coded indicia to provide an address signal representative of the present position of said code carrying means relative to said N sensor means.

11. A code system according to claim 10 further including signal generating means for producing an N bit binary signal identical to second N given ones of said binary coded indicia on said code carrying means and representative of a desired position of said code carrying means, said desired position being the position of said code carrying means when said second given ones of said binary coded indicia are proximate to said N sensor means.

12. A code system according to claim 11 further including means for producing a first analog signal representative of the numerical analog of the sector containing said first N given ones of said binary coded indicia on said code carrying means and means for producing a second analog signal representative of the numerical analog of the sector containing said second N given ones of said binary coded indicia on said code carrying means, and means, for subtracting said first analog signal from said second analog signal to provide a difference signal representative of the numerical difference between the sector numbers of the sectors containing said first and second N given binary coded indicia on said code carrying means, and means responsive to said difference signal from said subtracting means for generating and transmitting a positioning signal to said code carrying means for moving said code carrying means to a position wherein said second N given binary indicia are proximate said N sensor means, said positioning signal moving said code carrying means in the direction of least distance.

References Cited

UNITED STATES PATENTS

| | | | |
|---|---|---|---|
| 3,074,059 | 1/1963 | Flavan | 340—365 |
| 3,078,404 | 2/1963 | Dumaire | 318—162 |
| 3,105,927 | 10/1963 | Flatten et al. | 318—19 |
| 3,183,342 | 3/1965 | Wortzman | 235—156 |

MAYNARD R. WILBUR, Primary Examiner

CHARLES D. MILLER, Assistant Examiner